(12) United States Patent
Bercier et al.

(10) Patent No.: US 12,535,413 B2
(45) Date of Patent: Jan. 27, 2026

(54) SPECTROSCOPIC EVALUATION OF TALLOW

(71) Applicant: Cargill, Incorporated, Wayzata, MN (US)

(72) Inventors: Martine Cécile Bercier, London (CA); Amanda Louise Carroll, Otsego, MN (US); Tina M. Hoetmer, Valley Center, KS (US); Lyndakaye EmaLee Prior, Princeton, MN (US)

(73) Assignee: Cargill, Incorporated, Wayzata, MN (US)

( * ) Notice: Subject to any disclaimer, the term of this patent is extended or adjusted under 35 U.S.C. 154(b) by 111 days.

(21) Appl. No.: 18/040,382

(22) PCT Filed: Jul. 30, 2021

(86) PCT No.: PCT/US2021/043853
§ 371 (c)(1),
(2) Date: Feb. 2, 2023

(87) PCT Pub. No.: WO2022/031530
PCT Pub. Date: Feb. 10, 2022

(65) Prior Publication Data
US 2023/0273125 A1 Aug. 31, 2023

Related U.S. Application Data

(60) Provisional application No. 63/060,782, filed on Aug. 4, 2020.

(51) Int. Cl.
*G01N 21/3577* (2014.01)
*G01N 1/28* (2006.01)
(Continued)

(52) U.S. Cl.
CPC .......... *G01N 21/359* (2013.01); *G01N 1/286* (2013.01); *G01N 33/03* (2013.01); *G01N 33/28* (2013.01); *G01N 2201/0221* (2013.01)

(58) Field of Classification Search
CPC .. G01N 1/286; G01N 21/3577; G01N 21/359; G01N 21/84; G01N 33/03;
(Continued)

(56) References Cited

U.S. PATENT DOCUMENTS 5,648,413 A 7/1997 Sato
7,194,369 B2 * 3/2007 Lundstedt ........ G01N 35/00871
702/104
(Continued)

FOREIGN PATENT DOCUMENTS

CN 104990889 A 10/2015
CN 105203489 A 12/2015
(Continued)

OTHER PUBLICATIONS

Adewale et al., "Determination of the iodine value and the free fatty acid content of waste animal fat blends using FT-NIR." Vibrational Spectroscopy 72 (2014): 72-78.
(Continued)

*Primary Examiner* — Hina F Ayub

(57) ABSTRACT

A characteristic of tallow may be evaluated using a spectrometer such as a near infrared (NIR) spectrometer. For example, optical reflectance data may be obtained from tallow, the reflectance data corresponding to a specified range of infra-red wavelengths. A value corresponding to the characteristic may be output based on the reflectance data generated by the spectrometer. The characteristic may include moisture, free fatty acid, or insoluble impurities as a percentage or concentration in a sample, for example.

18 Claims, 15 Drawing Sheets

(51) Int. Cl.
  *G01N 21/17*      (2006.01)
  *G01N 21/359*     (2014.01)
  *G01N 21/84*      (2006.01)
  *G01N 33/03*      (2006.01)
  *G01N 33/28*      (2006.01)

(58) Field of Classification Search
  CPC ... G01N 2021/1761; G01N 2201/0221; G01N 2201/129; G01N 33/18; G01N 33/28
  See application file for complete search history.

(56) References Cited

U.S. PATENT DOCUMENTS

| | | | | |
|---|---|---|---|---|
| 8,010,309 | B2 * | 8/2011 | Lundstedt | G01N 35/00871 702/104 |
| 11,162,932 | B2 * | 11/2021 | Dong | A47J 37/1266 |
| 11,579,132 | B2 * | 2/2023 | Dong | G01N 21/3577 |
| 2001/0037182 | A1 | 11/2001 | Hall | |
| 2003/0154044 | A1 * | 8/2003 | Lundstedt | G01N 35/00871 702/181 |
| 2006/0063912 | A1 * | 3/2006 | Mullane | C09F 1/02 530/230 |
| 2006/0213554 | A1 | 9/2006 | Welch | |
| 2007/0143037 | A1 * | 6/2007 | Lundstedt | G01N 21/274 702/30 |
| 2010/0197535 | A1 | 8/2010 | Brossaud | |
| 2011/0054864 | A1 | 3/2011 | Lundstedt | |
| 2011/0293544 | A1 | 12/2011 | Brown | |
| 2012/0232300 | A1 | 9/2012 | Summers et al. | |
| 2013/0008341 | A1 | 1/2013 | Hunt | |
| 2014/0349406 | A1 | 11/2014 | Higgins | |
| 2017/0009181 | A1 | 1/2017 | Kotoneva | |
| 2019/0162658 | A1 | 5/2019 | Zhang et al. | |
| 2021/0270730 | A1 * | 9/2021 | Dong | G01N 21/3577 |
| 2023/0168234 | A1 * | 6/2023 | Dong | A47J 37/1266 250/341.8 |
| 2023/0273124 | A1 * | 8/2023 | Bercier | G01N 33/03 250/341.1 |
| 2023/0296507 | A1 * | 9/2023 | Bercier | G01N 33/18 356/326 |

FOREIGN PATENT DOCUMENTS

| | | | | |
|---|---|---|---|---|
| CN | 204945036 | U | | 1/2016 |
| CN | 106970042 | A | * | 7/2017 ........... G01N 21/359 |
| CN | 207163906 | U | | 3/2018 |
| CN | 110426368 | A | | 11/2019 |
| CN | 110726688 | A | | 1/2020 |
| CN | 211043124 | U | | 7/2020 |
| DE | 19644722 | A1 | | 4/1998 |
| EP | 0034047 | A1 | | 8/1981 |
| JP | 57142546 | A | | 9/1982 |
| JP | 2018077202 | A | * | 5/2018 |
| KR | 101158474 | B1 | * | 6/2012 |

OTHER PUBLICATIONS

Adomako, "Fatty acid composition and characteristics of Pentadesma butyracea fat extracted from Ghana seeds." Journal of the Science of Food and Agriculture 28.4 (1977): 384-386.

Armenta et al., "The use of near-infrared spectrometry in the olive oil industry." Critical Reviews in Food Science and Nutrition 50.6 (2010): 567-582.

Bellorini et al. "Discriminating animal fats and their origins: assessing the potentials of Fourier transform infrared spectroscopy, gas chromatography, immunoassay and polymerase chain reaction techniques." Analytical and Bioanalytical Chemistry 382 (2005): 1073-1083.

Roodenko et al., "Non-dispersive infrared (NDIR) sensor for real-time nitrate monitoring in wastewater treatment." Optical Fibers and Sensors for Medical Diagnostics and Treatment Applications XIX. vol. 10872. SPIE, 2019. 7 pages.

Shenk et al., "Populations structuring of near infrared spectra and modified partial least squares regression." Crop Science 31.6 (1991): 1548-1555.

Chen, "A new approach to near-infrared spectral data analysis using independent component analysis," Jul. 23, 2001, Journal of Chemical Information and Computer Sciences, 41(4):992-1001.

Galvez-Sola et al., "Effectiveness of Near Infrared Reflectance Spectroscopy in the Quick Evaluation of Nitrogen Content in Sewage Sludge," Jan. 1, 2009, Communications in Soil Science and Plant Analysis, vol. 40: 726-735. (Year: 2009).

Prieto et al., "A review of the principles and applications of near-infrared spectroscopy to characterize meat, fat, and meat products," Jul. 1, 2017, Applied Spectroscopy, 71(7), 1403-1426.

Su et al., "Development of near infrared reflectance spectroscopy to predict chemical composition with a wide range of variability in beef," Oct. 1, 2014, Meat Science, 98(2):110-114.

Suehara et al., "Rapid and simple determination of oil and urea concentrations and solids content to monitor biodegradation conditions of wastewater discharged from a biodiesel fuel production plant," 2007, J. Near Infrared Spectrosc. vol. 15, pp. 89-96. (Year: 2007).

Tøgersen et al., "On-line prediction of chemical composition of semi-frozen ground beef by non-invasive NIR spectroscopy," Apr. 1, 2003, Meat Science, 63(4):515-523.

* cited by examiner

SPECTROSCOPIC EVALUATION OF TALLOW

CROSS-REFERENCE TO RELATED APPLICATIONS

This application is a national phase of International Patent Application No. PCT/US2021/043853, filed Jul. 30, 2021, which claims the benefit of U.S. Provisional Patent Application No. 63,060,782, filed Aug. 4, 2020, each of which is incorporated herein by reference in its entirety.

BACKGROUND

Scientists employ a variety of analytical tools to assist in quantitative evaluation of various characteristics of products, from raw materials to finished goods. Generally, analytical tools may rely upon careful control and preparation of a sample for evaluation, such as according to a standardized test or evaluation protocol in a "bench" setting. In this manner, traceable and repeatable results may be obtained. Such techniques may be applied to tallow. Use of analytical techniques to evaluate tallow helps to verify or maintain quality throughout the production and distribution process. For example, after processing, bench analytical techniques may be used to verify that minor components are at or below specified levels. Analytical techniques may also be used to assess tallow for a presence of contaminants or adulterants.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The systems and methods described herein use spectroscopy to characterize edible or inedible tallow, such as using a reflectance spectroscopy technique in a near-infrared range of wavelengths. These systems and methods may include evaluating a sample to determine a percentage or concentration of a particular characteristic. For example, the characteristic may include moisture, free fatty acid (FFA), or insoluble impurities. A value as a percentage or concentration may be output based on raw spectroscopy data output from a spectrometer.

A sample of tallow may be evaluated using the systems and methods described herein. The sample may be taken from a tallow, for example from a tanker, hopper, transport container, etc., such as in-situ on a train car, at a farm, at a distribution or processing facility, or the like. The tallow may be edible or inedible. The sample may be prepared, for example by melting, stirring, shaking, covering, placed in a clear container, such as a petri dish, or cooled (e.g., allowed to solidify), or a slurry cup (e.g., with a specified thickness). For example, a tallow sample may be melted with limited heat and shaken and poured into a petri dish to fill the petri dish (e.g., around 6 g of tallow). A lid may be placed on the petri dish and the tallow may be allowed to solidify (e.g., cool). The prepared samples may be placed into a spectrometer.

The spectrometer may scan the prepared sample, for example with infrared spectroscopy. A processor (e.g., of a spectrometer device) may be used to determine a value corresponding to a characteristic for the prepared sample based on a result of the scan (e.g., based on raw data output by the spectrometer). The value corresponding to the Characteristic may be output, for example displayed on a display device of the spectrometer, sent to a remote device (e.g., a mobile device such as a phone for display), or the like. The process may be repeated (e.g., two to four times) with the same prepared sample to generate a value indicative of a central tendency, such as an average or median value. This may help avoid inconsistencies.

Figure 1:
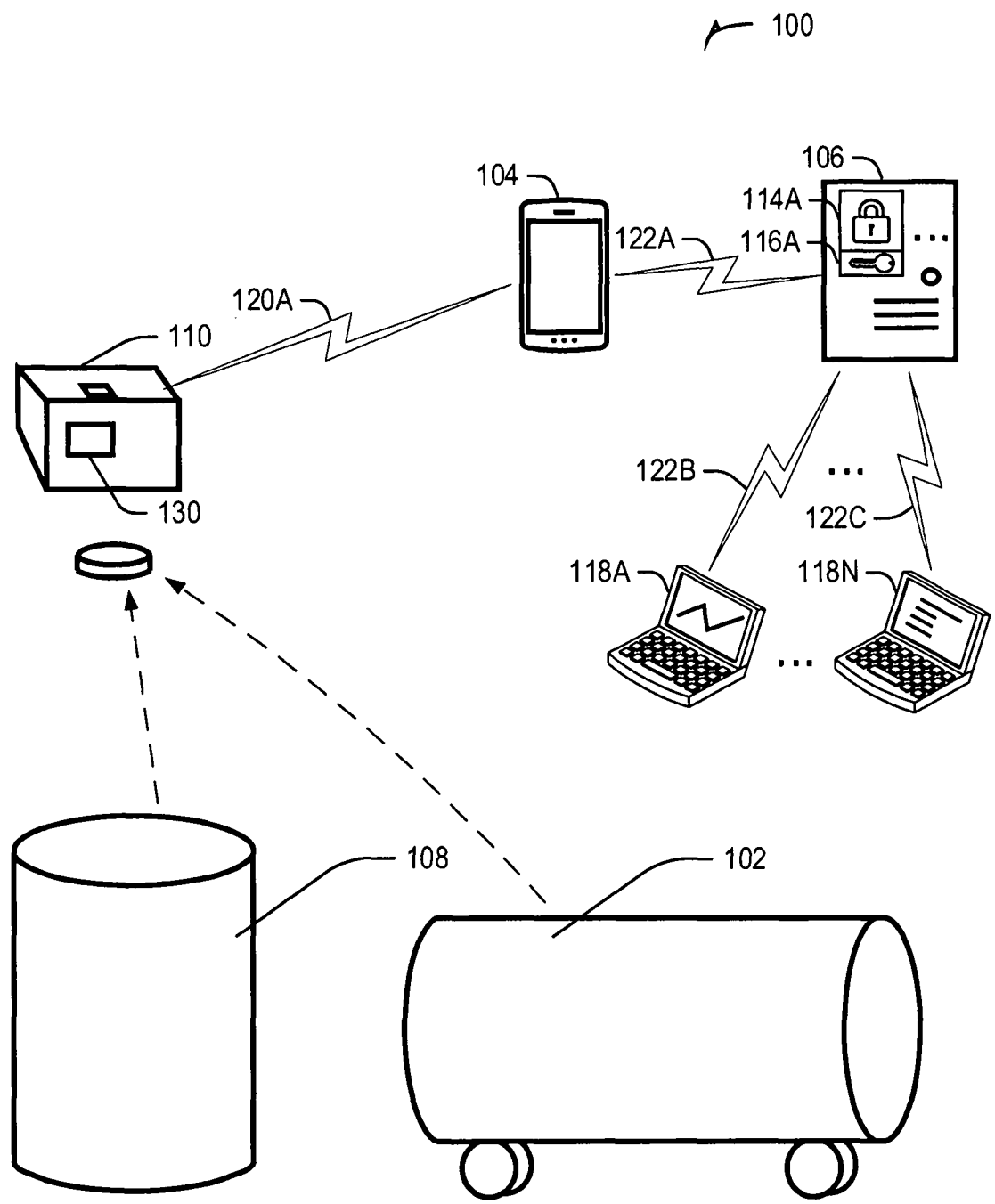
FIG. 1 illustrates generally an example showing a system that may include a spectrometer, such as for characterization of tallow.

FIG. 1 illustrates generally an example showing a system 100 that may include a spectrometer 110, such as for characterization of tallow, such as from a tank 108 or a tanker 102. Evaluation of a characteristic of the tallow may be performed with the tallow within a holding vessel in an example. In another example, the characteristic may be evaluated without needing to remove a sample from the tank 108 or tanker 102. The spectrometer 110 may include a user interface 130, such as including a user input or a display, as mentioned in relation to other examples described herein. In an example, the spectrometer 110 may be portable, such as sized and shaped to be manipulated by a user by hand. The spectrometer may be configured to emit light comprising a specified range of infra-red wavelengths, and to receive a reflection from tallow. The spectrometer 110 may then establish reflectance data corresponding to the received reflection without requiring physical contact between the spectrometer 110 and the tallow.

The spectrometer 110 may include a processor circuit configured to provide reflectance data comprising a series of values corresponding to discrete wavelength values spanning a specified range of wavelengths. As an illustrative example, the specified range may include wavelengths from about 400 nanometers to about 2500 nanometers. The spectrometer 110 may include a housing and hardware configuration similar to the FOSS NIR 5000/6500 or DS2500 (available from Foss, Hilleroed, Denmark) or the SCiO apparatus (available from Consumer Physics, Tel Aviv, Israel). Reflectance data from a range of 750 nanometers to 1070 nanometers may be provided. The use of reflectance spectroscopy in the near-infrared range of wavelengths is illustrative, and other spectroscopic techniques may be used. The spectrometer 110 may be coupled via a wired or wireless communication channel 120A to another device, such as a device 104 (e.g., a mobile device such as a cellular handset, a tablet device, a "phablet" device having a cellular or wireless networking adaptor, a laptop or desktop computer, or a base-station located in a facility housing the frying apparatus 102, as illustrative examples).

The wireless communication channel 120A may be established according to a wireless communication standard such as Bluetooth® (e.g., Bluetooth® Low Energy (BLE) as described in the Bluetooth Core Specification, v. 5.0, published Dec. 6, 2016, by the Bluetooth® Special Interest Group, Kirkland, Washington) or according to one or more other standards (e.g., the Institute of Electrical and Electronics Engineers (IEEE) 802.11 family of standards known as Wi-Fi®, mobile communications standards such as relating to 4G/Long Term Evolution (LTE), or the IEEE 802.15.4 family of standards, as illustrative examples).

The device 104 may include one or more processor circuits coupled to one or more memory circuits. For example, the device 104 may be configured to transform received reflectance data provided by the spectrometer 110 such as using a model profile to generate a value of a characteristic being assessed. The device 104 may be coupled through another wireless communication channel 122A to a repository 106 such as a remotely-located server or a cloud-based (e.g., distributed) facility. For example, the wireless communication channel 122A may be established according to a wireless networking protocol mentioned above, or a digital cellular networking protocol, as illustrative examples. One or more criteria may be applied to the transformed reflectance data. For example, a value of a characteristic being assessed, such as a parameter relating to Free Fatty Acid (FFA), moisture, or insoluble impurities, may be determined from spectroscopy data for the tallow. The result may be presented to a user. The representation (which may include a color code, such as green or red corresponding to a threshold) may be presented to the user via the user interface 130 of the spectrometer or the device 104, or the like.

In another example, the device 104 serves as an intermediary device, and the repository 106 (or other facility such as a cloud-based resource) may perform the transformation of the reflectance data to establish a value of the characteristic being assessed. In yet another example, the spectrometer 110 includes one or more processor circuits coupled to one or more memory circuits, and the device 104 need not be used. For example, the spectrometer 110 may transmit reflectance data to the repository 106 for processing (e.g., transformation), or the spectrometer 110 may transform reflectance data.

Data generated by the spectrometer may be used to generate a percentage or concentration of a characteristic in a sample. Calibration models, for each product type and analyte as described herein, may be based on an array of data created from the NIR spectra points and the wet chemistry analysis values.

The NIR spectra, including the signature of the samples, is correlated to the reference analysis values for specific analytes, for example a wet chemistry analysis method. This creates an algorithm or calibration model that may be used to predict the analyte values for similar products that fall within the parameter of the calibration model. The NIR spectra points may be generally collected at every 0.5 nm, from 400 to 2500 nm wavelength range, in an example.

To create the algorithm models, the step between points may be widened and only part of the wavelength range may be used. In an example, the math treatments selected are: 1st or 2nd derivatives, Gap of 4 to 24, 1st smoothing 4 to 24, 2nd smoothing 1 or 2

Scatter correction pre-processing may be done using standard normal variate and detrending. An algorithm may be created, for example using a Modified Partial Least Square (MPLS) method, for example based on a process initially defined by Shenk, J. S. and Westerhaus, M.O. (1991), Population Structuring of Near Infrared Spectra and Modified Partial Least Squares Regression. Crop Sciences 31, pp. 1548-1555.

MPLS involves a process of removing multivariate outliers & 'inliers' in a 2-step process. It involves the computation of Mahalanobis distances and in the 1st step data within the 3.0 boundary is selected and in a 2nd step, the data points further than 0.6 from each other are selected. The calibration models may then be developed using dedicated software (e.g., WinISI from Foss Analytics of Denmark).

Similar results may be obtained different software & mathematics, such as with calibrator software or from the many machine learning algorithms or modelling framework available such as MATLAB, Unscrambler, R Earth, Python Py-Earth, Multivariate adaptive regression spline (MARS), or the like.

Figure 2:
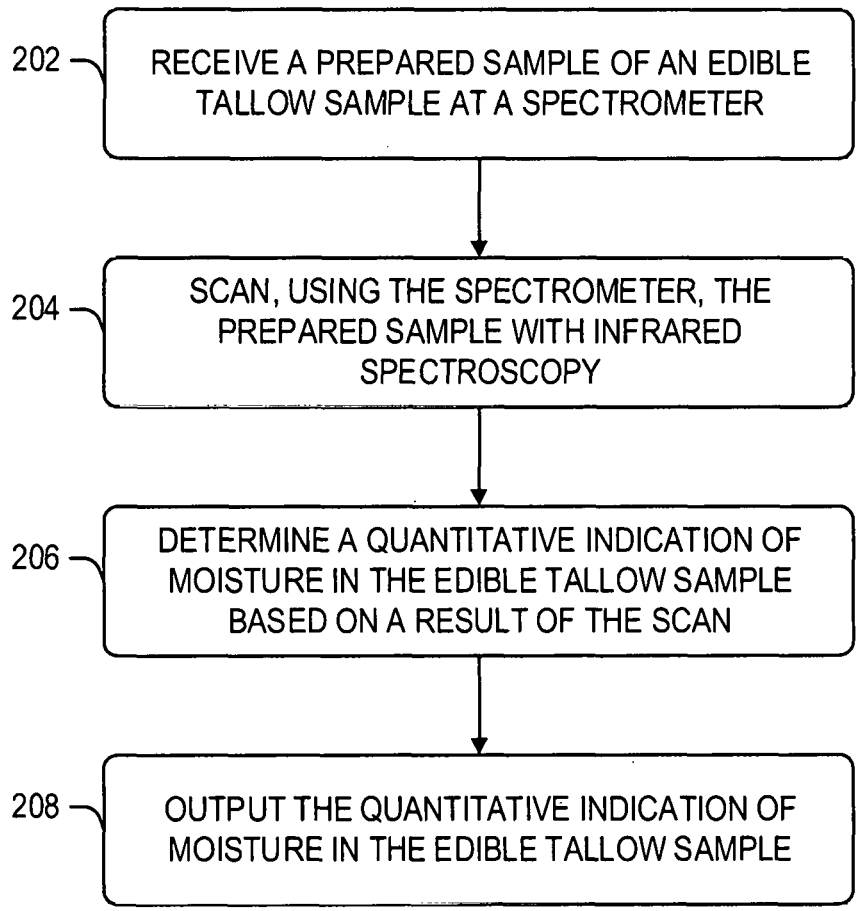
FIG. 2 illustrates generally an example comprising a technique, such as an automated method, for determining an indication of moisture in an edible tallow sample using a spectrometer.

FIG. 2 illustrates generally an example comprising a technique 200, such as an automated method, for determining an indication of moisture in an edible tallow sample using a spectrometer. The technique 200 includes an operation 202 to receive a prepared sample of an edible tallow sample at a spectrometer. The sample may be prepared by melting, agitating, or covering the edible tallow, for example in a petri dish or a slurry cup (e.g., with a specified thickness). The sample may be prepared directly from a mobile tanker or a bulk tanker in an example. The technique 200 may be performed on-site where the sample is extracted.

The technique 200 includes an operation 204 to scan, using the spectrometer, the prepared sample with infrared spectroscopy. The infrared spectroscopy may include infrared transmission spectroscopy or infrared reflection spectroscopy. A wavelength of the infrared spectroscopy may be within a near infrared spectrum, for example (e.g., 780 nm to 2500 nm). In an example, the wavelength may be within a range of frequencies between 400 nanometers and 2500 nanometers. The spectrometer may be a portable or mobile spectrometer.

The technique 200 includes an operation 206 to determine, for example using a processor (e.g., of the spectrometer), an indication of moisture in the edible tallow sample based on a result of the scan. The indication may include a quantitative indication, such as a relative indication, a ratio, a fraction such as a decimal fraction, or a percentage. Operation 206 may include converting raw spectrometer readings or data to a characteristic value using a formula.

The technique 200 includes an operation 208 to output the indication of moisture in the edible tallow sample. Operation 208 may include displaying the indication of moisture in the edible tallow sample on a display of the spectrometer or sending the indication of moisture in the edible tallow sample to a mobile device for display. In an example, operation 208 may include outputting an average or median of two or more iterations of the technique 200.

Figure 3:
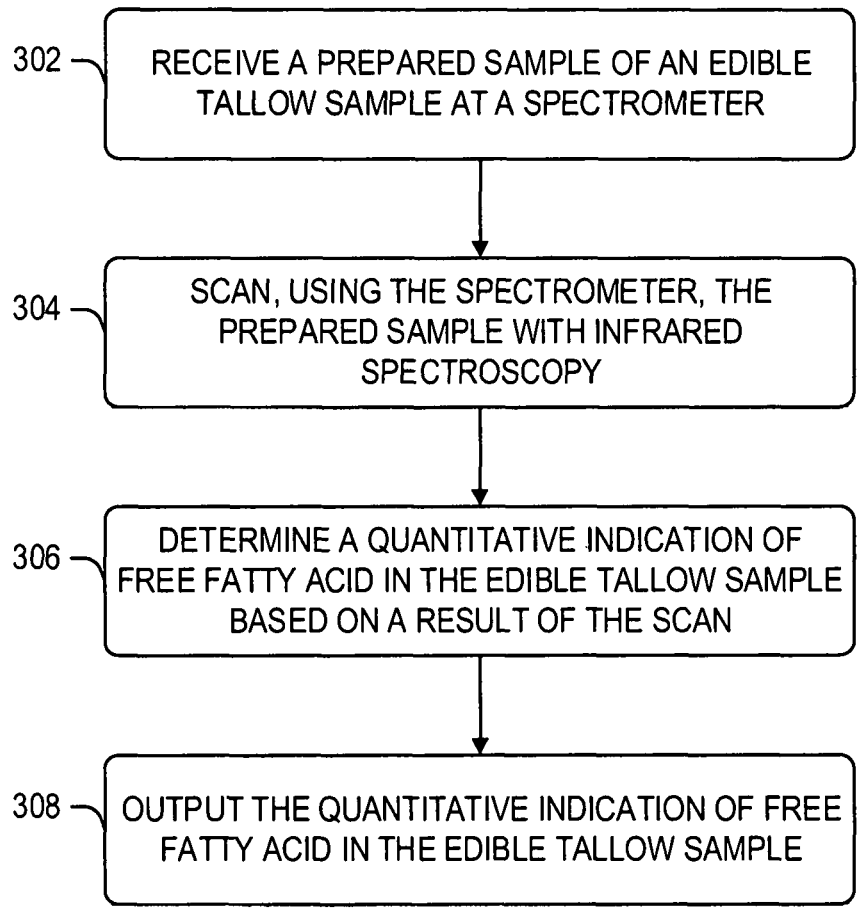
FIG. 3 illustrates generally an example comprising a technique, such as an automated method, for determining an indication of free fatty acid in an edible tallow sample using a spectrometer.

FIG. 3 illustrates generally an example comprising a technique 300, such as an automated method, for determining an indication of free fatty acid in an edible tallow sample using a spectrometer. The technique 300 includes an operation 302 to receive a prepared sample of an edible tallow sample at a spectrometer. The sample may be prepared by melting, agitating, or covering the edible tallow, for example in a petri dish or a slurry cup (e.g., with a specified thickness). The sample may be prepared directly from a mobile tanker or a bulk tanker in an example. The technique 300 may be performed on-site where the sample is extracted.

The technique 300 includes an operation 304 to scan, using the spectrometer, the prepared sample with infrared spectroscopy. The infrared spectroscopy may include infrared transmission spectroscopy or infrared reflection spectroscopy. A wavelength of the infrared spectroscopy may be within a near infrared spectrum, for example (e.g., 780 nm to 2500 nm). In an example, the wavelength may be within a range of frequencies between 400 nanometers and 2500 nanometers. The spectrometer may be a portable or mobile spectrometer.

The technique 300 includes an operation 306 to determine, for example using a processor (e.g., of the spectrometer), an indication of free fatty acid in the edible tallow sample based on a result of the scan. The indication may include a quantitative indication, such as a relative indication, a ratio, a fraction such as a decimal fraction, or a percentage. Operation 306 may include converting raw spectrometer readings or data to a characteristic value using a formula.

The technique 300 includes an operation 308 to output the indication of free fatty acid in the edible tallow sample. Operation 308 may include displaying the indication of free fatty acid in the edible tallow sample on a display of the spectrometer or sending the indication of free fatty acid in the edible tallow sample to a mobile device for display. In an example, operation 308 may include outputting an average or median of two or more iterations of the technique 300.

Figure 4:
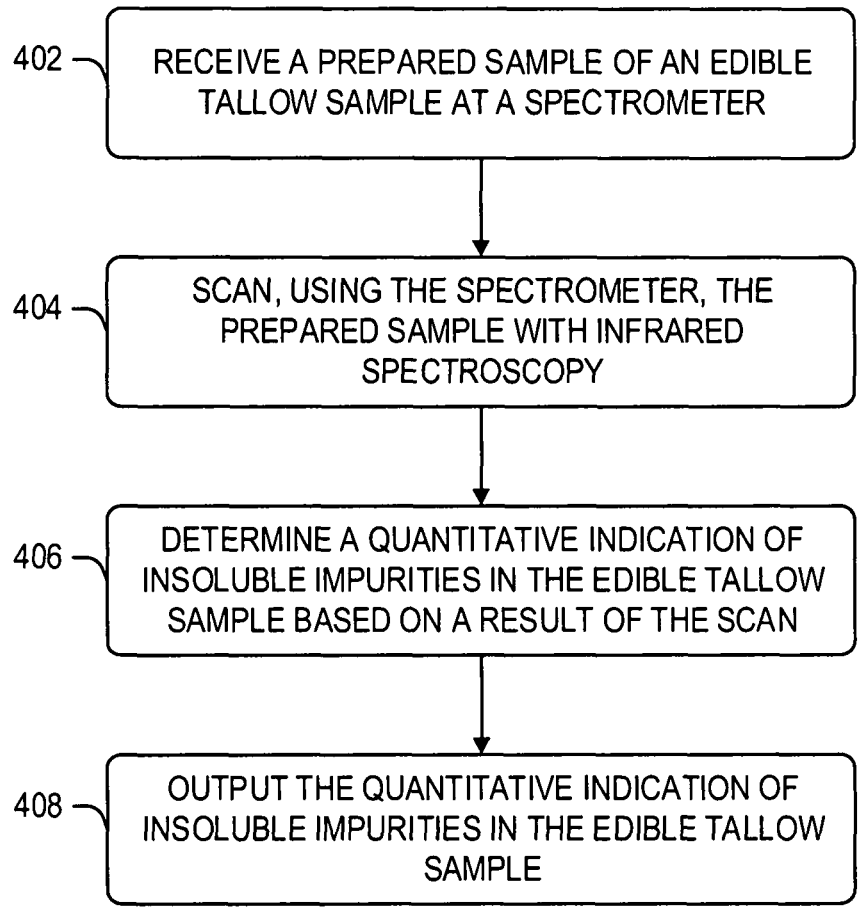
FIG. 4 illustrates generally an example comprising a technique, such as an automated method, for determining an indication of insoluble impurities in an edible tallow sample using a spectrometer.

FIG. 4 illustrates generally an example comprising a technique 400, such as an automated method, for determining an indication of insoluble impurities in an edible tallow sample using a spectrometer. The technique 400 includes an operation 402 to receive a prepared sample of an edible tallow sample at a spectrometer. The sample may be prepared by melting, agitating, or covering the edible tallow, for example in a petri dish or a slurry cup (e.g., with a specified thickness). The sample may be prepared directly from a mobile tanker or a bulk tanker in an example. The technique 400 may be performed on-site where the sample is extracted.

The technique 400 includes an operation 404 to scan, using the spectrometer, the prepared sample with infrared spectroscopy. The infrared spectroscopy may include infrared transmission spectroscopy or infrared reflection spectroscopy. A wavelength of the infrared spectroscopy may be within a near infrared spectrum, for example (e.g., 780 nm to 2500 nm). In an example, the wavelength may be within a range of frequencies between 400 nanometers and 2500 nanometers. The spectrometer may be a portable or mobile spectrometer.

The technique 400 includes an operation 406 to determine, for example using a processor (e.g., of the spectrometer), an indication of insoluble impurities in the edible tallow sample based on a result of the scan. The indication may include a quantitative indication, such as a relative indication, a ratio, a fraction such as a decimal fraction, or a percentage. Operation 406 may include converting raw spectrometer readings or data to a characteristic value using a formula.

The technique 400 includes an operation 408 to output the indication of insoluble impurities in the edible tallow sample. Operation 408 may include displaying the indication of insoluble impurities in the edible tallow sample on a display of the spectrometer or sending the indication of insoluble impurities in the edible tallow sample to a mobile device for display. In an example, operation 408 may include outputting an average or median of two or more iterations of the technique 400.

Figure 5:
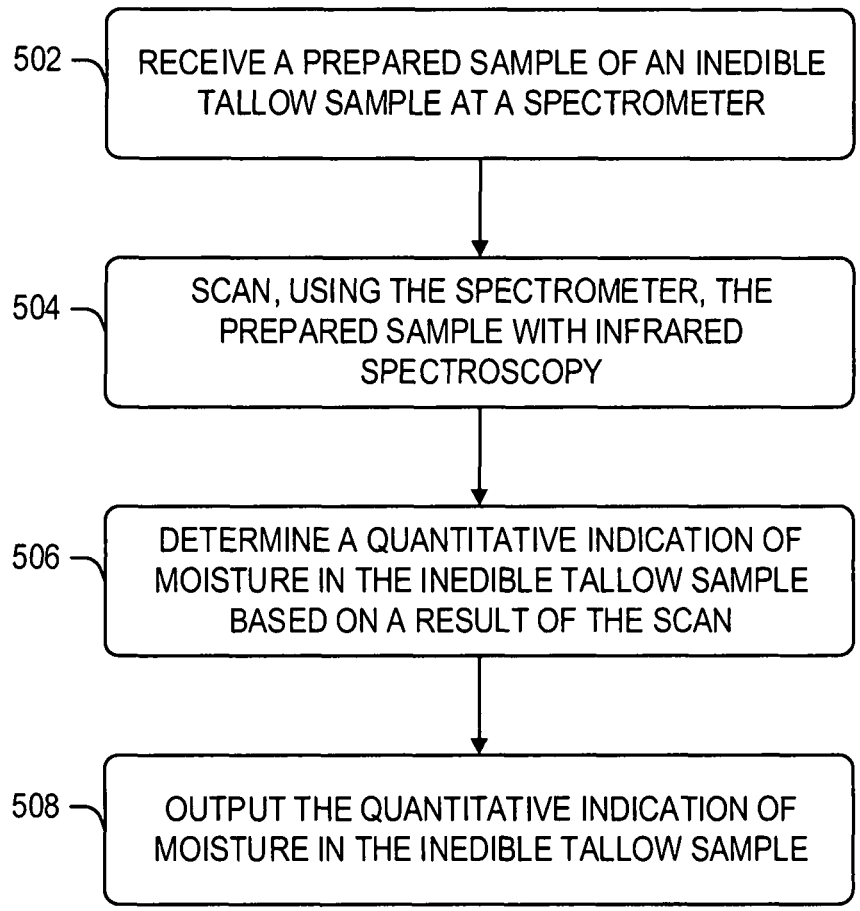
FIG. 5 illustrates generally an example comprising a technique, such as an automated method, for determining an indication of moisture in an inedible tallow sample using a spectrometer.

FIG. 5 illustrates generally an example comprising a technique 500, such as an automated method, for determining an indication of moisture in an inedible tallow sample using a spectrometer. The technique 500 includes an operation 502 to receive a prepared sample of an inedible tallow sample at a spectrometer. The sample may be prepared by melting, agitating, or covering the inedible tallow, for example in a petri dish or a slurry cup (e.g., with a specified thickness). The sample may be prepared directly from a mobile tanker or a bulk tanker in an example. The technique 500 may be performed on-site where the sample is extracted.

The technique 500 includes an operation 504 to scan, using the spectrometer, the prepared sample with infrared spectroscopy. The infrared spectroscopy may include infrared transmission spectroscopy or infrared reflection spectroscopy. A wavelength of the infrared spectroscopy may be within a near infrared spectrum, for example (e.g., 780 nm to 2500 nm). In an example, the wavelength may be within a range of frequencies between 400 nanometers and 2500 nanometers. The spectrometer may be a portable or mobile spectrometer.

The technique 500 includes an operation 506 to determine, for example using a processor (e.g., of the spectrometer), an indication of moisture in the inedible tallow sample based on a result of the scan. The indication may include a quantitative indication, such as a relative indication, a ratio, a fraction such as a decimal fraction, or a percentage. Operation 506 may include converting raw spectrometer readings or data to a characteristic value using a formula.

The technique 500 includes an operation 508 to output the indication of moisture in the inedible tallow sample. Operation 508 may include displaying the indication of moisture in the inedible tallow sample on a display of the spectrometer or sending the indication of moisture in the inedible tallow sample to a mobile device for display. In an example, operation 508 may include outputting an average or median of two or more iterations of the technique 500.

Figure 6:
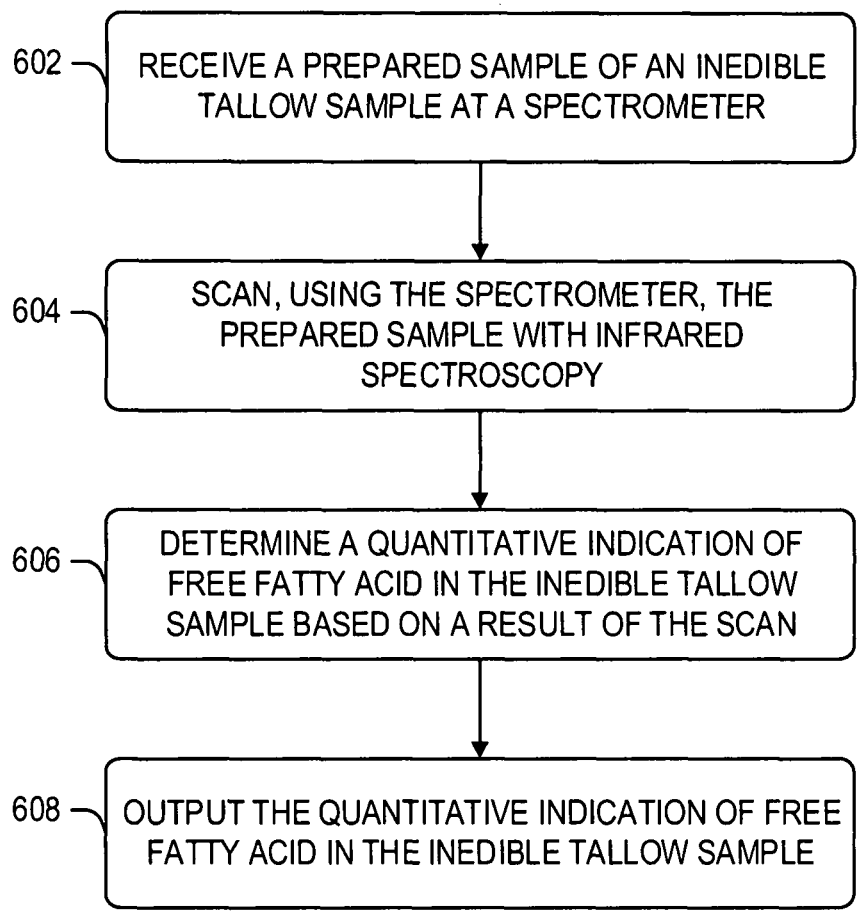
FIG. 6 illustrates generally an example comprising a technique, such as an automated method, for determining an indication of free fatty acid in an inedible tallow sample using a spectrometer.

FIG. 6 illustrates generally an example comprising a technique 600, such as an automated method, for determining an indication of free fatty acid in an inedible tallow sample using a spectrometer. The technique 600 includes an operation 602 to receive a prepared sample of an inedible tallow sample at a spectrometer. The sample may be prepared by melting, agitating, or covering the inedible tallow, for example in a petri dish or a slurry cup (e.g., with a specified thickness). The sample may be prepared directly from a mobile tanker or a bulk tanker in an example. The technique 600 may be performed on-site where the sample is extracted.

The technique 600 includes an operation 604 to scan, using the spectrometer, the prepared sample with infrared spectroscopy. The infrared spectroscopy may include infrared transmission spectroscopy or infrared reflection spectroscopy. A wavelength of the infrared spectroscopy may be within a near infrared spectrum, for example (e.g., 780 nm to 2500 nm). In an example, the wavelength may be within a range of frequencies between 400 nanometers and 2500 nanometers. The spectrometer may be a portable or mobile spectrometer.

The technique 600 includes an operation 606 to determine, for example using a processor (e.g., of the spectrometer), an indication of free fatty acid in the inedible tallow sample based on a result of the scan. The indication may include a quantitative indication, such as a relative indication, a ratio, a fraction such as a decimal fraction, or a percentage. Operation 606 may include converting raw spectrometer readings or data to a characteristic value using a formula.

The technique 600 includes an operation 608 to output the indication of free fatty acid in the inedible tallow sample. Operation 608 may include displaying the indication of free fatty acid in the inedible tallow sample on a display of the spectrometer or sending the indication of free fatty acid in the inedible tallow sample to a mobile device for display. In an example, operation 608 may include outputting an average or median of two or more iterations of the technique 600.

Figure 7:
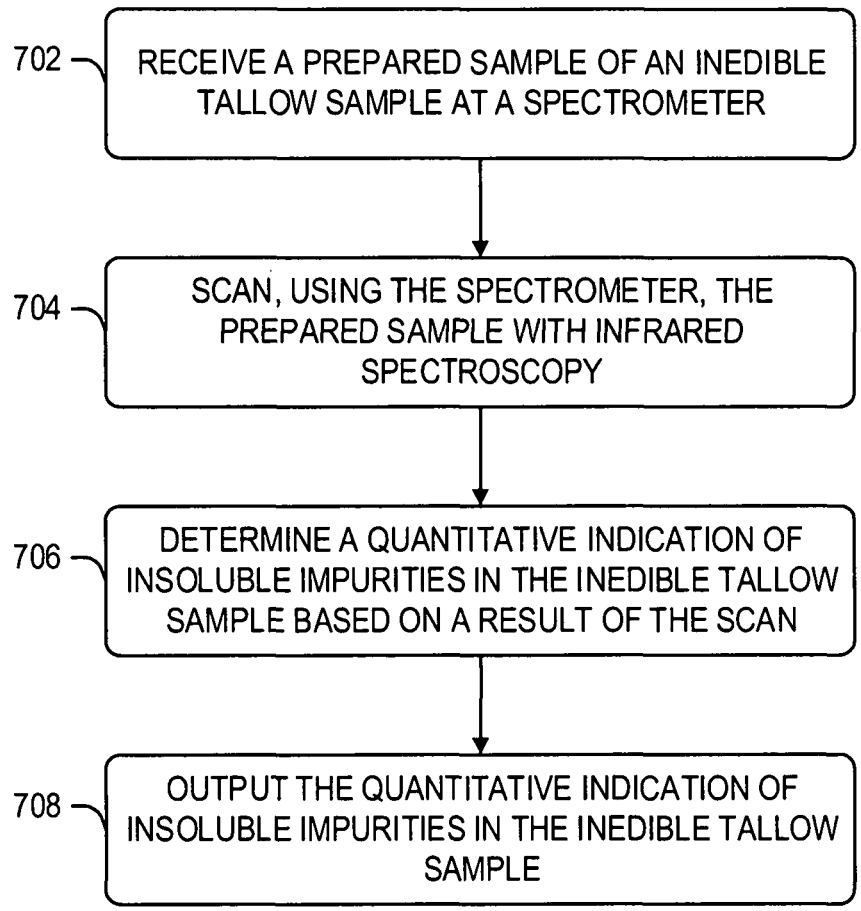
FIG. 7 illustrates generally an example comprising a technique, such as an automated method, for determining an indication of insoluble impurities in an inedible tallow sample using a spectrometer.

FIG. 7 illustrates generally an example comprising a technique 700, such as an automated method, for determining an indication of insoluble impurities in an inedible tallow sample using a spectrometer. The technique 700 includes an operation 702 to receive a prepared sample of an inedible tallow sample at a spectrometer. The sample may be prepared by melting, agitating, or covering the inedible tallow, for example in a petri dish or a slurry cup (e.g., with a specified thickness). The sample may be prepared directly from a mobile tanker or a bulk tanker in an example. The technique 700 may be performed on-site where the sample is extracted.

The technique 700 includes an operation 704 to scan, using the spectrometer, the prepared sample with infrared spectroscopy. The infrared spectroscopy may include infrared transmission spectroscopy or infrared reflection spectroscopy. A wavelength of the infrared spectroscopy may be within a near infrared spectrum, for example (e.g., 780 nm to 2500 nm). In an example, the wavelength may be within a range of frequencies between 400 nanometers and 2500 nanometers. The spectrometer may be a portable or mobile spectrometer.

The technique 700 includes an operation 706 to determine, for example using a processor (e.g., of the spectrometer), an indication of insoluble impurities in the inedible tallow sample based on a result of the scan. The indication may include a quantitative indication, such as a relative indication, a ratio, a fraction such as a decimal fraction, or a percentage. Operation 706 may include converting raw spectrometer readings or data to a characteristic value using a formula.

The technique 700 includes an operation 708 to output the indication of insoluble impurities in the inedible tallow sample. Operation 708 may include displaying the indication of insoluble impurities in the inedible tallow sample on a display of the spectrometer or sending the indication of insoluble impurities in the inedible tallow sample to a mobile device for display. In an example, operation 708 may include outputting an average or median of two or more iterations of the technique 700.

Figure 8:
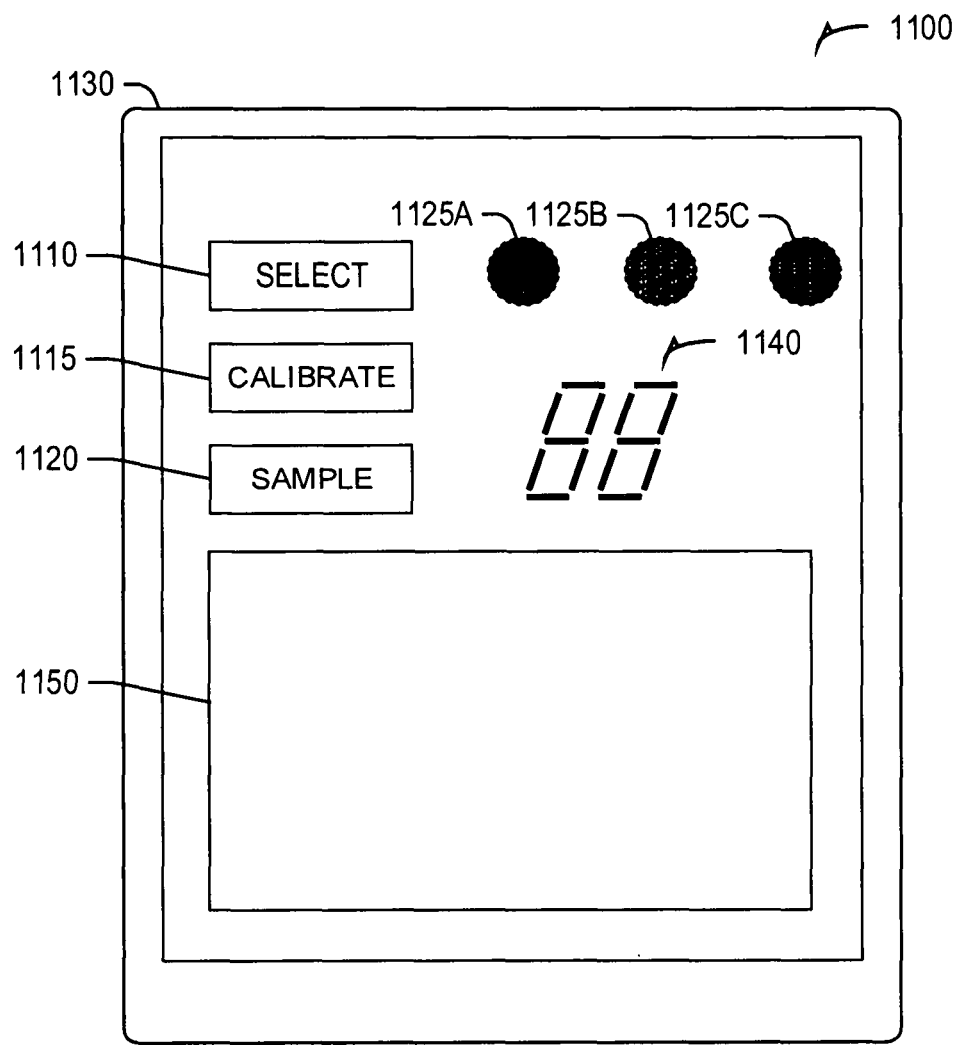
FIG. 8 illustrates generally an example comprising a user input and display, such as a touch-screen user interface, such as may be used to receive inputs to control a spectrometer or to present results, such as a representation of a characteristic of tallow being assessed using the spectrometer.

FIG. 8 illustrates generally an example 1100 comprising a user input and display, such as a touch-screen user interface 1130, such as may be used to receive inputs to control a spectrometer or to present results, such as a representation of a characteristic of tallow being assessed using the spectrometer (such as the spectrometer 110 shown in FIG. 1), or a separate device in communication with the spectrometer, such as a mobile device or tablet. As an illustrative example, an input 1110 may be used to receive an indication from the user that a particular characteristic is to be tested. Another input 1115 may be used to receive an indication from the user that the spectrometer is to be calibrated. An input 1120 may used to receive an indication from the user that a scan of a sample is to be initiated.

As mentioned in relation to various examples herein, data obtained using the spectrometer may be used to output a value of a characteristic being assessed, such as moisture, free fatty acid (FFA), or insoluble impurities. The value itself may be presented on a display 1150 of the touch-screen user interface 1130 or a simplified representation may be presented (e.g., a pass/fail indication via a light or lights, for example based on a threshold). For example, the simplified representation may include a visual indication that the sample (i.e., tallow) has a value for the characteristic over or below a threshold or within a range, such as via a "traffic light" (green/yellow/red, for example below a first threshold green, within a range between thresholds yellow, and above a second threshold red) style representation having three indicators 1125A, 1125B, or 1125C representing the threshold or range. Such states may be defined in a variety of manners, such as including a first state corresponding to "OK," an second state such as "possibly unusable" or "try again," or a third state indicative that the tallow sample has a characteristic above a threshold for example "not ok."

The interface of the example 1100 of FIG. 8 shows user inputs unified with a display for presentation of results, but these elements may also be separate. For example, the inputs may be provided by soft-keys aligned with a display, or by a separate keypad or input (e.g., switches, knobs, etc.). The display may include a bit-field display or other display (e.g., an LED or liquid-crystal display having pre-defined display elements, such as a numerical indicator 1140 having seven-segment digits or other arrangement or indicators 1125A, 1125B, 1125C comprising LED lamps). As an illustrative example, a unitless scale may be shown, such as a simplified numerical scale having values from one to five, or one to ten, such as having higher values to indicate relative concentration or percentage of the characteristic in the sample. Various aspects may be presented on the display 150, which may include a touchscreen display for receiving user input and displaying information.

Experimentally-Obtained Results

The results shown in FIG. 9, FIG. 10, FIG. 11, FIG. 12, FIG. 13, and FIG. 14 were obtained using a DS2500 device with a prepared sample inserted within, as described herein. In each of FIG. 9, FIG. 10, FIG. 11, FIG. 12, FIG. 13, and FIG. 14, the results in the graph show a predicted value (from a near-infrared spectroscopy result) against a wet chemistry (e.g., laboratory) derived value for a particular sample. A regression line is shown, which fits within two control lines (e.g., threshold lines of tolerance). A 45-degree line is shown for reference as well (e.g., a perfect fit). The majority of predicted results fit within the control lines, and the regression line fits within the control lines. In an example, the regression line may be determined using a Residual Prediction Deviation (RPD), by taking a standard deviation of characteristic values divided by a Root Mean Square Error or Prediction (RMSEP) value.

Figure 9:
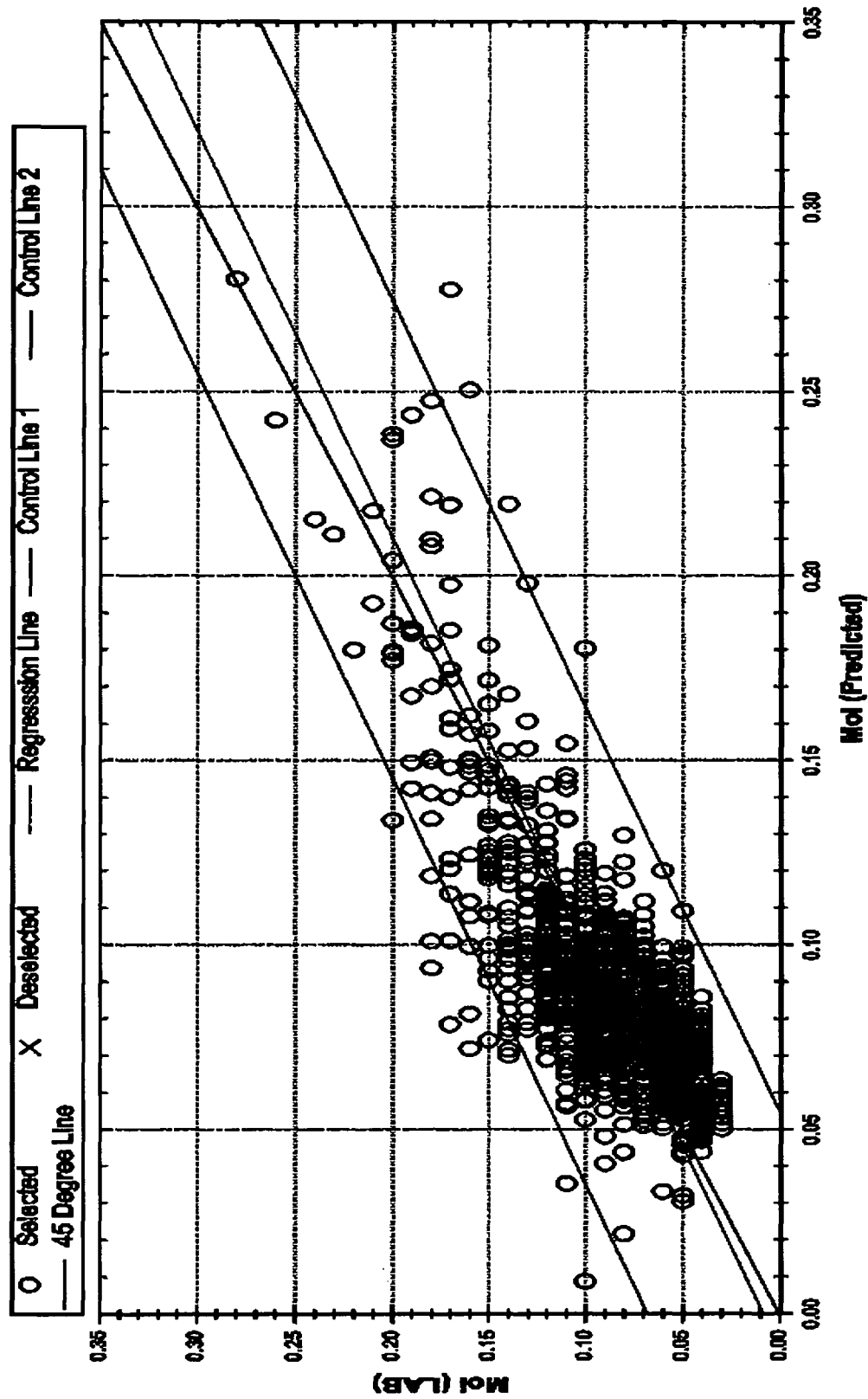
FIG. 9 illustrates generally an illustrative example of experimentally-obtained results including a predicted moisture value obtained by transforming spectroscopic data, plotted versus corresponding measurements of the moisture value using a laboratory technique.

FIG. 9 illustrates generally an illustrative example of experimentally-obtained results including a predicted moisture value obtained by transforming spectroscopic data, plotted versus corresponding measurements of the moisture value using a laboratory technique.

Figure 10:
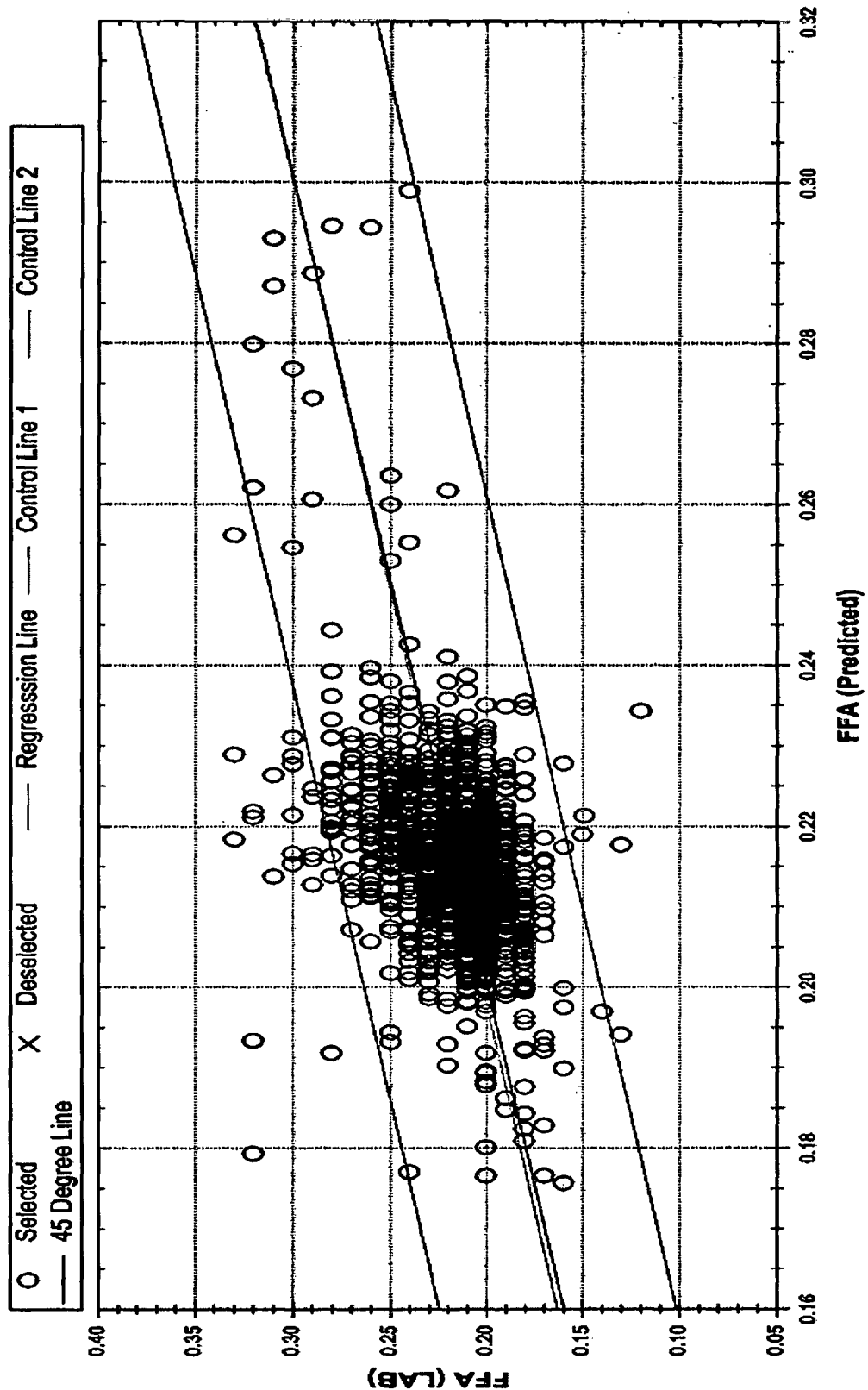
FIG. 10 illustrates generally an illustrative example of experimentally-obtained results including a free fatty acid (FFA) value obtained by transforming spectroscopic data, plotted versus corresponding measurements of the FFA value using a laboratory technique.

FIG. 10 illustrates generally an illustrative example of experimentally-obtained results including a free fatty acid (FFA) value obtained by transforming spectroscopic data, plotted versus corresponding measurements of the FFA value using a laboratory technique.

Free fatty acids are produced by the hydrolysis of oils and fats. The level of FFA depends on time, temperature and moisture content because the oils and fats are exposed to various environments such as storage, processing, heating or frying. Since FFA are less stable than neutral oil, they are more prone to oxidation and to turning rancid. Thus, FFA is a key feature linked with the quality and commercial value of oils and fats. The American Oil Chemists' Society (AOCS), the Association of Official Analytical Chemists (AOAC) and the European Commission (EC) Regulations have established almost identical standard methods for the assessment of FFA. These methods are based on titration, where oils or fats need to be dissolved in hot neutralized ethanol or ethanol/diethyl ether using phenolphthalein as an end point indicator. Titrimetric procedures are, however, laborious and need large amounts of chemicals and solvents. The cost of chemicals and environmental issues further limit these procedures. In addition, accurate detection of end points, especially for highly colored crude oil using a colorimetric indicator, is a difficult task. Despite these disadvantages, the titration method is still being used in many of the edible-oil industries for the determination of FFA. The various methods discussed herein provide an alternative to this titration method. These various methods described herein include instrumental methods, which may be performed with high sensitivity, accuracy and rapidity.

Figure 11:
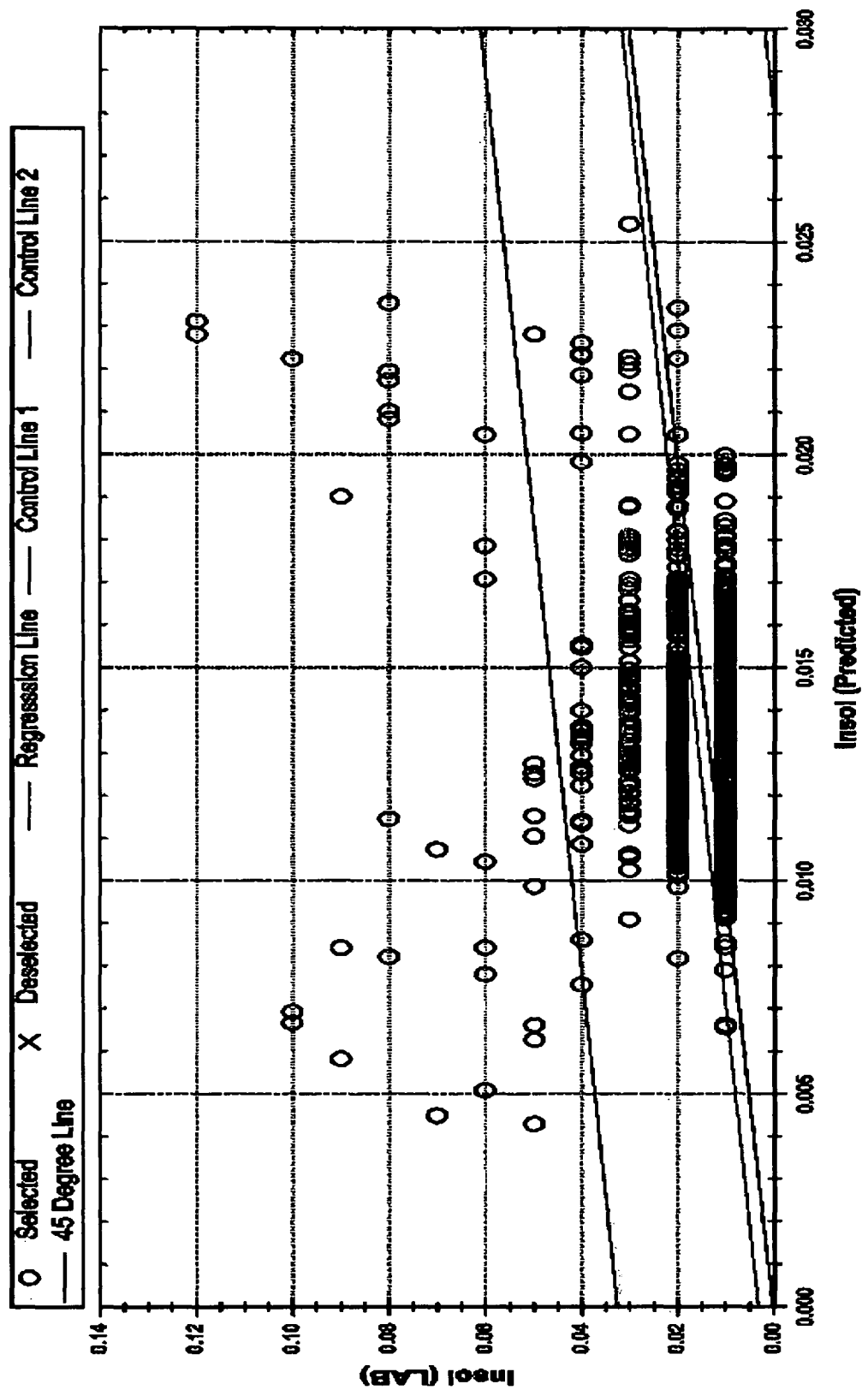
FIG. 11 illustrates generally an illustrative example of experimentally-obtained results including a predicted insoluble impurity value obtained by transforming spectroscopic data, plotted versus corresponding measurements of the insoluble impurity value using a laboratory technique.

FIG. 11 illustrates generally an illustrative example of experimentally-obtained results including a predicted insoluble impurity value obtained by transforming spectroscopic data, plotted versus corresponding measurements of the insoluble impurity value using a laboratory technique.

Figure 12:
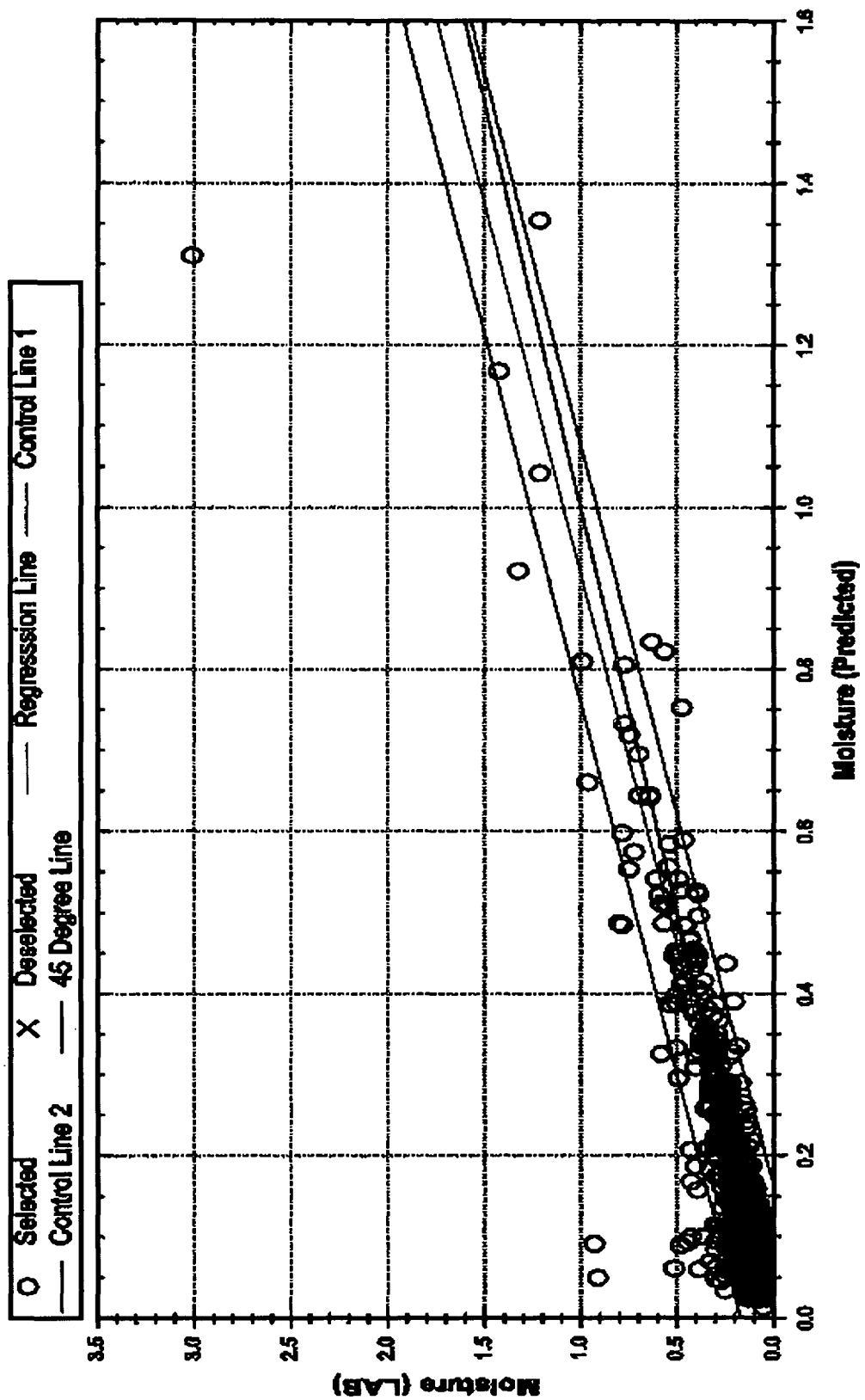
FIG. 12 illustrates generally an illustrative example of experimentally-obtained results including a predicted moisture value obtained by transforming spectroscopic data, plotted versus corresponding measurements of the moisture value using a laboratory technique.

FIG. 12 illustrates generally an illustrative example of experimentally-obtained results including a predicted moisture value obtained by transforming spectroscopic data, plotted versus corresponding measurements of the moisture value using a laboratory technique.

Figure 13:
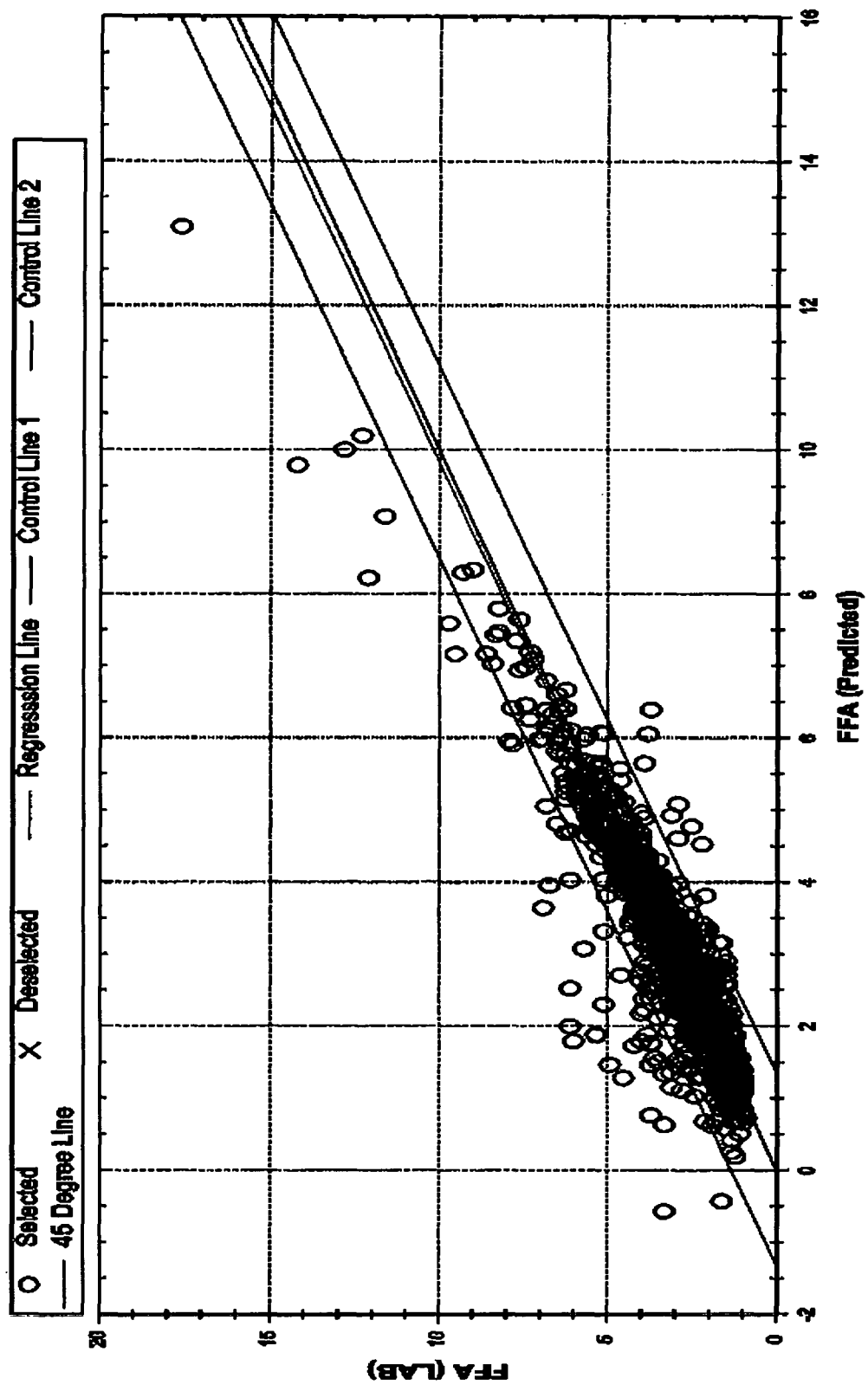
FIG. 13 illustrates generally an illustrative example of experimentally-obtained results including a free fatty acid (FFA) value obtained by transforming spectroscopic data, plotted versus corresponding measurements of the FFA value using a laboratory technique.

FIG. 13 illustrates generally an illustrative example of experimentally-obtained results including a free fatty acid (FFA) value obtained by transforming spectroscopic data, plotted versus corresponding measurements of the FFA value using a laboratory technique.

Figure 14:
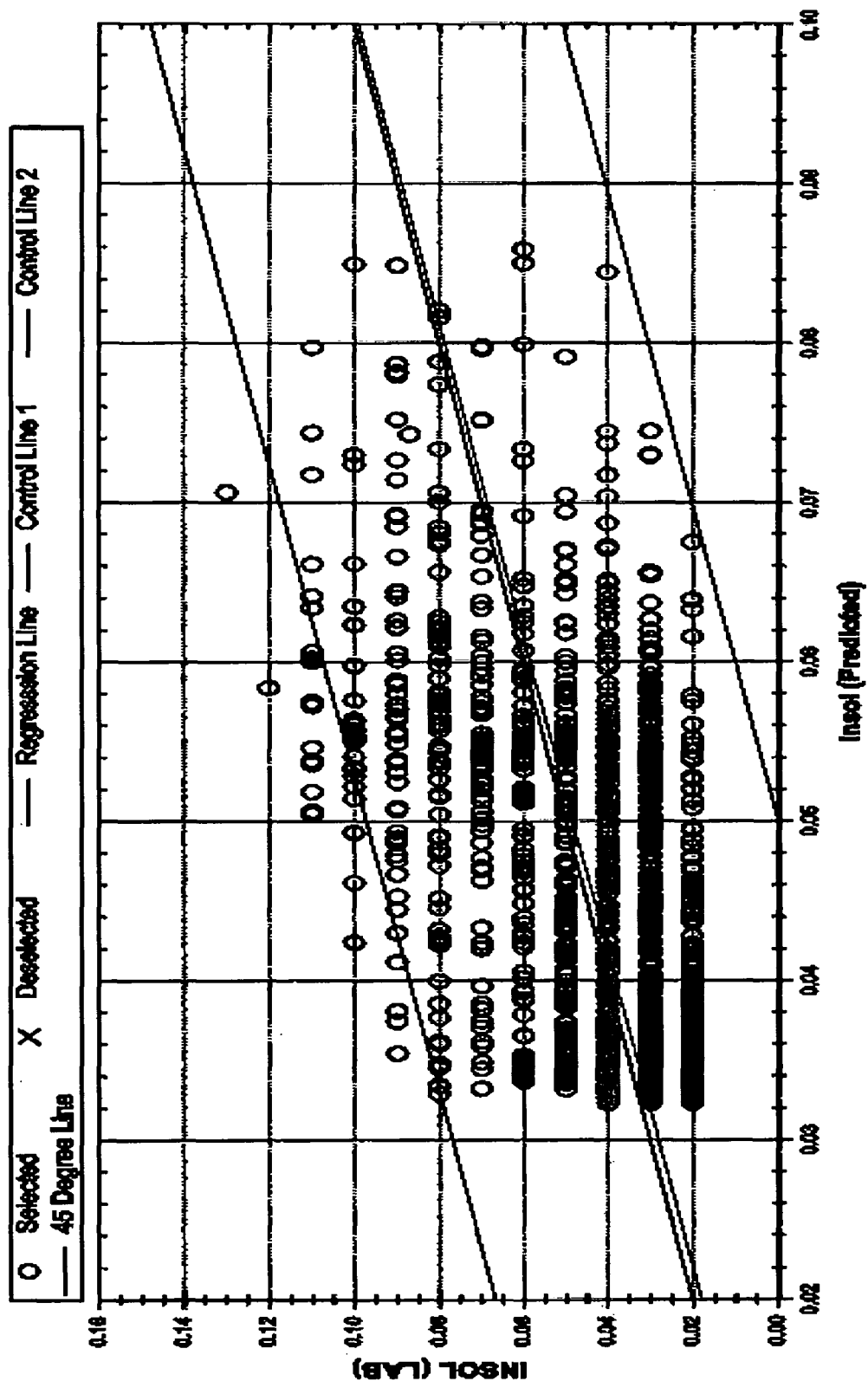
FIG. 14 illustrates generally an illustrative example of experimentally-obtained results including a predicted insoluble impurity value obtained by transforming spectroscopic data, plotted versus corresponding measurements of the insoluble impurity value using a laboratory technique.

FIG. 14 illustrates generally an illustrative example of experimentally-obtained results including a predicted insoluble impurity value obtained by transforming spectroscopic data, plotted versus corresponding measurements of the insoluble impurity value using a laboratory technique.

Figure 15:
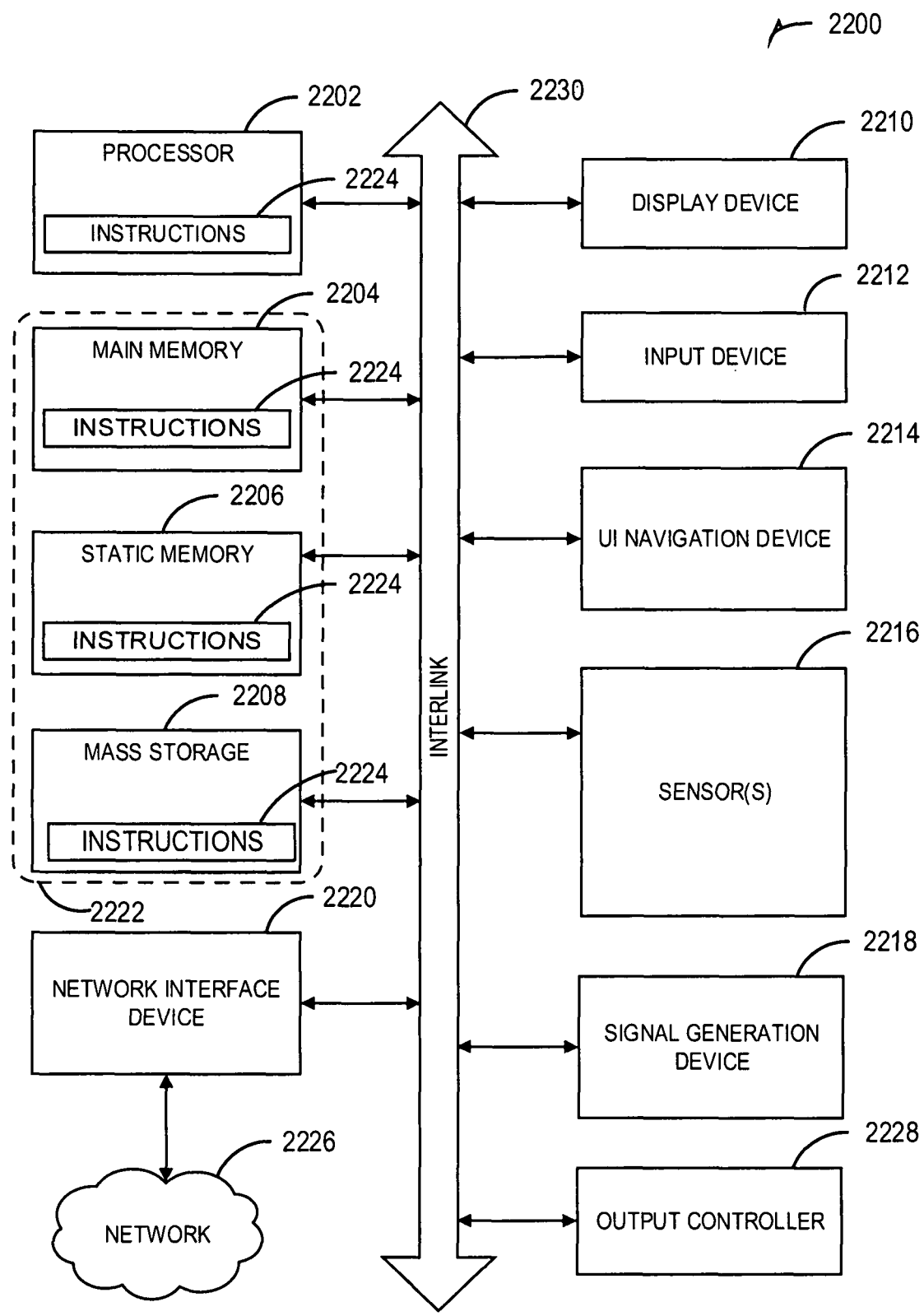
FIG. 15 illustrates a block diagram of an example comprising a machine upon which any one or more of the techniques (e.g., methodologies) discussed herein may be performed.

FIG. 15 illustrates a block diagram of an example comprising a machine 2200 upon which any one or more of the techniques (e.g., methodologies) discussed herein may be performed. The machine 2200 may be included as a portion of elements shown in the system 100 of FIG. 1. In various examples, the machine 2200 may operate as a standalone device or may be connected (e.g., networked) to other machines. In a networked deployment, the machine 2200 may operate in the capacity of a server machine, a client machine, or both in server-client network environments. In an example, the machine 2200 may act as a peer machine in peer-to-peer (P2P) (or other distributed) network environment. The machine 2200 may be a personal computer (PC), a tablet device, a personal digital assistant (PDA), a mobile telephone, a web appliance, a network router, switch or bridge, a portable (e.g., hand-held) spectrometer such as including a microprocessor or microcontroller, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. "Circuitry" refers generally a collection of circuits implemented in tangible entities that include hardware (e.g., simple circuits, gates, logic elements, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation.

In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 2200 may include a hardware processor 2202 (e.g., a central processing unit (CPU), a graphics processing unit (GPU), a hardware processor core, or any combination thereof), a main memory 2204 and a static memory 2206, some or all of which may communicate with each other via an interlink (e.g., bus) 2208. The machine 2200 may further include a display unit 2210, an alphanumeric input device 2212 (e.g., a keyboard), and a user interface (UI) navigation device 2214 (e.g., a mouse). In an example, the display unit 2210, input device 2212 and UI navigation device 2214 may be a touch screen display. The machine 2200 may additionally include a storage device (e.g., drive unit) 2216, a signal generation device 2218 (e.g., a speaker), a network interface device 2220, and one or more sensors 2221, such as a global positioning system (GPS) sensor, compass, accelerometer, or other sensor. The machine 2200 may include an output controller 2228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2216 may include a machine readable medium 2222 on which is stored one or more sets of data structures or instructions 2224 (e.g., software) embodying or utilized by any one or more of the techniques or functions described herein. The instructions 2224 may also reside, completely or at least partially, within the main memory 2204, within static memory 2206, or within the hardware processor 2202 during execution thereof by the machine 2200. In an example, one or any combination of the hardware processor 2202, the main memory 2204, the static memory 2206, or the storage device 2216 may constitute machine readable media.

While the machine readable medium 2222 is illustrated as a single medium, the term "machine readable medium" may include a single medium or multiple media (e.g., a centralized or distributed database, and/or associated caches and servers) configured to store the one or more instructions 2224.

The term "machine readable medium" may include any medium that is capable of storing, encoding, or carrying instructions for execution by the machine 2200 and that cause the machine 2200 to perform any one or more of the techniques of the present disclosure, or that is capable of storing, encoding or carrying data structures used by or associated with such instructions. Non-limiting machine readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 2224 may further be transmitted or received over a communications network 2226 using a transmission medium via the network interface device 2220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks such as conforming to one or more standards such as a 4G standard or Long Term Evolution (LTE)), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 2220 may include one or more physical jacks (e.g., Ethernet, coaxial, or phone jacks) or one or more antennas to connect to the communications network 2226. In an example, the network interface device 2220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2200, and includes digital or analog communications signals or other intangible medium to facilitate communication of such software.

Each of the non-limiting examples below can stand on its own, or can be combined in various permutations or combinations with one or more of the other aspects or other subject matter described in this document.

Example 1 is a method for near infrared evaluation of a characteristic of a sample, the method comprising: receiving a prepared sample of the sample at a spectrometer; scanning, using the spectrometer, the prepared sample with infrared spectroscopy; determining, using a processor, a value corresponding to the characteristic for the sample based on a result of the scan; and outputting the value.

In Example 2, the subject matter of Example 1 includes, wherein the prepared sample is prepared by covering the sample in a petri dish or a slurry cup.

In Example 3, the subject matter of Examples 1-2 includes, wherein the infrared spectroscopy includes infrared transmission spectroscopy or infrared reflection spectroscopy.

In Example 4, the subject matter of Examples 1-3 includes, wherein a wavelength of the infrared spectroscopy is within a near infrared spectrum.

In Example 5, the subject matter of Examples 1-4 includes, wherein a wavelength of the infrared spectroscopy is within a range of frequencies between 400 nanometers and 2500 nanometers.

In Example 6, the subject matter of Examples 1-5 includes, wherein the sample is prepared directly from a mobile tanker or a bulk tanker and wherein the method is performed on-site where the sample is extracted.

In Example 7, the subject matter of Examples 1-6 includes, wherein the spectrometer is a portable spectrometer.

In Example 8, the subject matter of Examples 1-7 includes, wherein outputting the value includes displaying the value on a display of the spectrometer or sending the value to a mobile device for display.

In Example 9, the subject matter of Examples 1-8 includes, wherein the prepared sample is prepared by agitating the sample while melting the sample.

In Example 10, the subject matter of Examples 1-9 includes, wherein outputting the value includes outputting an average or median of two or more iterations of the method.

In Example 11, the subject matter of Examples 1-10 includes, wherein the sample includes one of an edible tallow sample, an inedible tallow sample, or a tallow sample.

In Example 12, the subject matter of Examples 1-11 includes, wherein the value corresponding to the characteristic for the sample includes one of a percent of moisture in the sample, a percent of free fatty acid in the sample, a percent of insoluble impurities in the sample.

Example 13 is a system for near infrared evaluation of a characteristic of a sample, the system comprising: a spectrometer configured to: emit light comprising a specified range of infrared wavelengths; receive a reflection from a prepared sample of the sample; and establish reflectance data corresponding to the received reflection; and a processor circuit coupled to a memory circuit and communicatively coupled to the spectrometer, the processor circuit configured to: determine a value corresponding to the characteristic for the sample based on a result of the scan; and output the value.

In Example 14, the subject matter of Example 13 includes, wherein the prepared sample is prepared by covering the sample in a petri dish or a slurry cup.

In Example 15, the subject matter of Examples 13-14 includes, wherein the infrared spectroscopy includes infrared transmission spectroscopy or infrared reflection spectroscopy.

In Example 16, the subject matter of Examples 13-15 includes, wherein a wavelength of the infrared spectroscopy is within a near infrared spectrum.

In Example 17, the subject matter of Examples 13-16 includes, wherein a wavelength of the infrared spectroscopy is within a range of frequencies between 400 nanometers and 2500 nanometers.

In Example 18, the subject matter of Examples 13-17 includes, wherein the sample is prepared directly from a mobile tanker or a bulk tanker and wherein the method is performed on-site where the sample is extracted.

In Example 19, the subject matter of Examples 13-18 includes, wherein the spectrometer is a portable spectrometer.

In Example 20, the subject matter of Examples 13-19 includes, wherein the spectrometer includes a display, and wherein to output the value, the processor circuit is configured to cause the display to present the value.

In Example 21, the subject matter of Examples 13-20 includes, wherein the prepared sample is prepared by agitating the sample while melting the sample.

In Example 22, the subject matter of Examples 13-21 includes, wherein to output the value, the processor circuit is configured to determine a second value and output an average of the value and the second value.

In Example 23, the subject matter of Examples 13-22 includes, wherein the sample includes one of an edible tallow sample, an inedible tallow sample, or a tallow sample.

In Example 24, the subject matter of Examples 13-23 includes, wherein the value corresponding to the characteristic for the sample includes one of a percent of moisture in the sample, a percent of free fatty acid in the sample, a percent of insoluble impurities in the sample.

Example 25 is a method for near infrared evaluation of a characteristic of an edible tallow sample, the method comprising: receiving a prepared sample of the edible tallow sample at a spectrometer; scanning, using the spectrometer, the prepared sample with infrared spectroscopy; determining, using a processor, a percent of moisture in the edible tallow sample based on a result of the scan; and outputting the percent of moisture in the edible tallow sample.

In Example 26, the subject matter of Example 25 includes, wherein the prepared sample is prepared by covering the edible tallow sample in a petri dish or a slurry cup.

In Example 27, the subject matter of Examples 25-26 includes, wherein the infrared spectroscopy includes infrared transmission spectroscopy or infrared reflection spectroscopy.

In Example 28, the subject matter of Examples 25-27 includes, wherein a wavelength of the infrared spectroscopy is within a near infrared spectrum.

In Example 29, the subject matter of Examples 25-28 includes, wherein a wavelength of the infrared spectroscopy is within a range of frequencies between 400 nanometers and 2500 nanometers.

In Example 30, the subject matter of Examples 25-29 includes, wherein the edible tallow sample is prepared directly from a mobile tanker or a bulk tanker and wherein the method is performed on-site where the edible tallow sample is extracted.

In Example 31, the subject matter of Examples 25-30 includes, wherein the spectrometer is a portable spectrometer.

In Example 32, the subject matter of Examples 25-31 includes, wherein outputting the percent of moisture in the edible tallow sample includes displaying the percent of moisture in the edible tallow sample on a display of the spectrometer or sending the percent of moisture in the edible tallow sample to a mobile device for display.

In Example 33, the subject matter of Examples 25-32 includes, wherein the prepared sample is prepared by agitating the edible tallow sample while melting the edible tallow sample.

Example 34 is a system for near infrared evaluation of a characteristic of an edible tallow sample, the system comprising: a spectrometer configured to: emit light comprising a specified range of infrared wavelengths; receive a reflection from a prepared sample of the edible tallow sample; and establish reflectance data corresponding to the received reflection; and a processor circuit coupled to a memory circuit and communicatively coupled to the spectrometer, the processor circuit configured to: determine a percent of moisture in the edible tallow sample corresponding to the characteristic for the edible tallow sample based on a result of the scan; and output the percent of moisture in the edible tallow sample.

In Example 35, the subject matter of Example 34 includes, wherein the prepared sample is prepared by covering the edible tallow sample in a petri dish or a slurry cup.

In Example 36, the subject matter of Examples 34-35 includes, wherein the infrared spectroscopy includes infrared transmission spectroscopy or infrared reflection spectroscopy.

In Example 37, the subject matter of Examples 34-36 includes, wherein a wavelength of the infrared spectroscopy is within a near infrared spectrum.

In Example 38, the subject matter of Examples 34-37 includes, wherein a wavelength of the infrared spectroscopy is within a range of frequencies between 400 nanometers and 2500 nanometers.

In Example 39, the subject matter of Examples 34-38 includes, wherein the edible tallow sample is prepared directly from a mobile tanker or a bulk tanker and wherein the method is performed on-site where the edible tallow sample is extracted.

In Example 40, the subject matter of Examples 34-39 includes, wherein the spectrometer is a portable spectrometer.

In Example 41, the subject matter of Examples 34-40 includes, wherein the spectrometer includes a display, and wherein to output the percent of moisture in the edible tallow sample, the processor circuit is configured to cause the display to present the percent of moisture in the edible tallow sample.

In Example 42, the subject matter of Examples 34-41 includes, wherein the prepared sample is prepared by agitating the edible tallow sample while melting the edible tallow sample.

Example 43 is a method for near infrared evaluation of a characteristic of an edible tallow sample, the method comprising: receiving a prepared sample of the edible tallow sample at a spectrometer; scanning, using the spectrometer, the prepared sample with infrared spectroscopy; determining, using a processor, a percent of free fatty acid in the edible tallow sample based on a result of the scan; and outputting the percent of free fatty acid in the edible tallow sample.

In Example 44, the subject matter of Example 43 includes, wherein the prepared sample is prepared by covering the edible tallow sample in a petri dish or a slurry cup.

In Example 45, the subject matter of Examples 43-44 includes, wherein the infrared spectroscopy includes infrared transmission spectroscopy or infrared reflection spectroscopy.

In Example 46, the subject matter of Examples 43-45 includes, wherein a wavelength of the infrared spectroscopy is within a near infrared spectrum.

In Example 47, the subject matter of Examples 43-46 includes, wherein a wavelength of the infrared spectroscopy is within a range of frequencies between 400 nanometers and 2500 nanometers.

In Example 48, the subject matter of Examples 43-47 includes, wherein the edible tallow sample is prepared directly from a mobile tanker or a bulk tanker and wherein the method is performed on-site where the edible tallow sample is extracted.

In Example 49, the subject matter of Examples 43-48 includes, wherein the spectrometer is a portable spectrometer.

In Example 50, the subject matter of Examples 43-49 includes, wherein outputting the percent of free fatty acid in the edible tallow sample includes displaying the percent of free fatty acid in the edible tallow sample on a display of the spectrometer or sending the percent of free fatty acid in the edible tallow sample to a mobile device for display.

In Example 51, the subject matter of Examples 43-50 includes, wherein the prepared sample is prepared by agitating the edible tallow sample while melting the edible tallow sample.

Example 52 is a system for near infrared evaluation of a characteristic of an edible tallow sample, the system comprising: a spectrometer configured to: emit light comprising a specified range of infrared wavelengths; receive a reflection from a prepared sample of the edible tallow sample; and establish reflectance data corresponding to the received reflection; and a processor circuit coupled to a memory circuit and communicatively coupled to the spectrometer, the processor circuit configured to: determine a percent of free fatty acid in the edible tallow sample corresponding to the characteristic for the edible tallow sample based on a result of the scan; and output the percent of free fatty acid in the edible tallow sample.

In Example 53, the subject matter of Example 52 includes, wherein the prepared sample is prepared by covering the edible tallow sample in a petri dish or a slurry cup.

In Example 54, the subject matter of Examples 52-53 includes, wherein the infrared spectroscopy includes infrared transmission spectroscopy or infrared reflection spectroscopy.

In Example 55, the subject matter of Examples 52-54 includes, wherein a wavelength of the infrared spectroscopy is within a near infrared spectrum.

In Example 56, the subject matter of Examples 52-55 includes, wherein a wavelength of the infrared spectroscopy is within a range of frequencies between 400 nanometers and 2500 nanometers.

In Example 57, the subject matter of Examples 52-56 includes, wherein the edible tallow sample is prepared directly from a mobile tanker or a bulk tanker and wherein the method is performed on-site where the edible tallow sample is extracted.

In Example 58, the subject matter of Examples 52-57 includes, wherein the spectrometer is a portable spectrometer.

In Example 59, the subject matter of Examples 52-58 includes, wherein the spectrometer includes a display, and wherein to output the percent of free fatty acid in the edible tallow sample, the processor circuit is configured to cause the display to present the percent of free fatty acid in the edible tallow sample.

In Example 60, the subject matter of Examples 52-59 includes, wherein the prepared sample is prepared by agitating the edible tallow sample while melting the edible tallow sample.

Example 61 is a method for near infrared evaluation of a characteristic of an edible tallow sample, the method comprising: receiving a prepared sample of the edible tallow sample at a spectrometer; scanning, using the spectrometer, the prepared sample with infrared spectroscopy; determining, using a processor, a percent of insoluble impurities in the edible tallow sample based on a result of the scan; and outputting the percent of insoluble impurities in the edible tallow sample.

In Example 62, the subject matter of Example 61 includes, wherein the prepared sample is prepared by covering the edible tallow sample in a petri dish or a slurry cup.

In Example 63, the subject matter of Examples 61-62 includes, wherein the infrared spectroscopy includes infrared transmission spectroscopy or infrared reflection spectroscopy.

In Example 64, the subject matter of Examples 61-63 includes, wherein a wavelength of the infrared spectroscopy is within a near infrared spectrum.

In Example 65, the subject matter of Examples 61-64 includes, wherein a wavelength of the infrared spectroscopy is within a range of frequencies between 400 nanometers and 2500 nanometers.

In Example 66, the subject matter of Examples 61-65 includes, wherein the edible tallow sample is prepared directly from a mobile tanker or a bulk tanker and wherein the method is performed on-site where the edible tallow sample is extracted.

In Example 67, the subject matter of Examples 61-66 includes, wherein the spectrometer is a portable spectrometer.

In Example 68, the subject matter of Examples 61-67 includes, wherein outputting the percent of insoluble impurities in the edible tallow sample includes displaying the percent of insoluble impurities in the edible tallow sample on a display of the spectrometer or sending the percent of insoluble impurities in the edible tallow sample to a mobile device for display.

In Example 69, the subject matter of Examples 61-68 includes, wherein the prepared sample is prepared by agitating the edible tallow sample while melting the edible tallow sample.

Example 70 is a system for near infrared evaluation of a characteristic of an edible tallow sample, the system comprising: a spectrometer configured to: emit light comprising a specified range of infrared wavelengths; receive a reflection from a prepared sample of the edible tallow sample; and establish reflectance data corresponding to the received reflection; and a processor circuit coupled to a memory circuit and communicatively coupled to the spectrometer, the processor circuit configured to: determine a percent of insoluble impurities in the edible tallow sample corresponding to the characteristic for the edible tallow sample based on a result of the scan; and output the percent of insoluble impurities in the edible tallow sample.

In Example 71, the subject matter of Example 70 includes, wherein the prepared sample is prepared by covering the edible tallow sample in a petri dish or a slurry cup.

In Example 72, the subject matter of Examples 70-71 includes, wherein the infrared spectroscopy includes infrared transmission spectroscopy or infrared reflection spectroscopy.

In Example 73, the subject matter of Examples 70-72 includes, wherein a wavelength of the infrared spectroscopy is within a near infrared spectrum.

In Example 74, the subject matter of Examples 70-73 includes, wherein a wavelength of the infrared spectroscopy is within a range of frequencies between 400 nanometers and 2500 nanometers.

In Example 75, the subject matter of Examples 70-74 includes, wherein the edible tallow sample is prepared directly from a mobile tanker or a bulk tanker and wherein the method is performed on-site where the edible tallow sample is extracted.

In Example 76, the subject matter of Examples 70-75 includes, wherein the spectrometer is a portable spectrometer.

In Example 77, the subject matter of Examples 70-76 includes, wherein the spectrometer includes a display, and wherein to output the percent of insoluble impurities in the edible tallow sample, the processor circuit is configured to cause the display to present the percent of insoluble impurities in the edible tallow sample.

In Example 78, the subject matter of Examples 70-77 includes, wherein the prepared sample is prepared by agitating the edible tallow sample while melting the edible tallow sample.

Example 79 is a method for near infrared evaluation of a characteristic of an inedible tallow sample, the method comprising: receiving a prepared sample of the inedible tallow sample at a spectrometer; scanning, using the spectrometer, the prepared sample with infrared spectroscopy; determining, using a processor, a percent of moisture in the inedible tallow sample based on a result of the scan; and outputting the percent of moisture in the inedible tallow sample.

In Example 80, the subject matter of Example 79 includes, wherein the prepared sample is prepared by covering the inedible tallow sample in a petri dish or a slurry cup.

In Example 81, the subject matter of Examples 79-80 includes, wherein the infrared spectroscopy includes infrared transmission spectroscopy or infrared reflection spectroscopy.

In Example 82, the subject matter of Examples 79-81 includes, wherein a wavelength of the infrared spectroscopy is within a near infrared spectrum.

In Example 83, the subject matter of Examples 79-82 includes, wherein a wavelength of the infrared spectroscopy is within a range of frequencies between 400 nanometers and 2500 nanometers.

In Example 84, the subject matter of Examples 79-83 includes, wherein the inedible tallow sample is prepared directly from a mobile tanker or a bulk tanker and wherein the method is performed on-site where the inedible tallow sample is extracted.

In Example 85, the subject matter of Examples 79-84 includes, wherein the spectrometer is a portable spectrometer.

In Example 86, the subject matter of Examples 79-85 includes, wherein outputting the percent of moisture in the inedible tallow sample includes displaying the percent of moisture in the inedible tallow sample on a display of the spectrometer or sending the percent of moisture in the inedible tallow sample to a mobile device for display.

In Example 87, the subject matter of Examples 79-86 includes, wherein the prepared sample is prepared by agitating the inedible tallow sample while melting the inedible tallow sample.

Example 88 is a system for near infrared evaluation of a characteristic of an inedible tallow sample, the system comprising: a spectrometer configured to: emit light comprising a specified range of infrared wavelengths; receive a reflection from a prepared sample of the inedible tallow sample; and establish reflectance data corresponding to the received reflection; and a processor circuit coupled to a memory circuit and communicatively coupled to the spectrometer, the processor circuit configured to: determine a percent of moisture in the inedible tallow sample corresponding to the characteristic for the inedible tallow sample based on a result of the scan; and output the percent of moisture in the inedible tallow sample.

In Example 89, the subject matter of Example 88 includes, wherein the prepared sample is prepared by covering the inedible tallow sample in a petri dish or a slurry cup.

In Example 90, the subject matter of Examples 88-89 includes, wherein the infrared spectroscopy includes infrared transmission spectroscopy or infrared reflection spectroscopy.

In Example 91, the subject matter of Examples 88-90 includes, wherein a wavelength of the infrared spectroscopy is within a near infrared spectrum.

In Example 92, the subject matter of Examples 88-91 includes, wherein a wavelength of the infrared spectroscopy is within a range of frequencies between 400 nanometers and 2500 nanometers.

In Example 93, the subject matter of Examples 88-92 includes, wherein the inedible tallow sample is prepared directly from a mobile tanker or a bulk tanker and wherein the method is performed on-site where the inedible tallow sample is extracted.

In Example 94, the subject matter of Examples 88-93 includes, wherein the spectrometer is a portable spectrometer.

In Example 95, the subject matter of Examples 88-94 includes, wherein the spectrometer includes a display, and wherein to output the percent of moisture in the inedible tallow sample, the processor circuit is configured to cause the display to present the percent of moisture in the inedible tallow sample.

In Example 96, the subject matter of Examples 88-95 includes, wherein the prepared sample is prepared by agitating the inedible tallow sample while melting the inedible tallow sample.

Example 97 is a method for near infrared evaluation of a characteristic of an inedible tallow sample, the method comprising: receiving a prepared sample of the inedible tallow sample at a spectrometer; scanning, using the spectrometer, the prepared sample with infrared spectroscopy; determining, using a processor, a percent of free fatty acid in the inedible tallow sample based on a result of the scan; and outputting the percent of free fatty acid in the inedible tallow sample.

In Example 98, the subject matter of Example 97 includes, wherein the prepared sample is prepared by covering the inedible tallow sample in a petri dish or a slurry cup.

In Example 99, the subject matter of Examples 97-98 includes, wherein the infrared spectroscopy includes infrared transmission spectroscopy or infrared reflection spectroscopy.

In Example 100, the subject matter of Examples 97-99 includes, wherein a wavelength of the infrared spectroscopy is within a near infrared spectrum.

In Example 101, the subject matter of Examples 97-100 includes, wherein a wavelength of the infrared spectroscopy is within a range of frequencies between 400 nanometers and 2500 nanometers.

In Example 102, the subject matter of Examples 97-101 includes, wherein the inedible tallow sample is prepared directly from a mobile tanker or a bulk tanker and wherein the method is performed on-site where the inedible tallow sample is extracted.

In Example 103, the subject matter of Examples 97-102 includes, wherein the spectrometer is a portable spectrometer.

In Example 104, the subject matter of Examples 97-103 includes, wherein outputting the percent of free fatty acid in the inedible tallow sample includes displaying the percent of free fatty acid in the inedible tallow sample on a display of the spectrometer or sending the percent of free fatty acid in the inedible tallow sample to a mobile device for display.

In Example 105, the subject matter of Examples 97-104 includes, wherein the prepared sample is prepared by agitating the inedible tallow sample while melting the inedible tallow sample.

Example 106 is a system for near infrared evaluation of a characteristic of an inedible tallow sample, the system comprising: a spectrometer configured to: emit light comprising a specified range of infrared wavelengths; receive a reflection from a prepared sample of the inedible tallow sample; and establish reflectance data corresponding to the received reflection; and a processor circuit coupled to a memory circuit and communicatively coupled to the spectrometer, the processor circuit configured to: determine a percent of free fatty acid in the inedible tallow sample corresponding to the characteristic for the inedible tallow sample based on a result of the scan; and output the percent of free fatty acid in the inedible tallow sample.

In Example 107, the subject matter of Example 106 includes, wherein the prepared sample is prepared by covering the inedible tallow sample in a petri dish or a slurry cup.

In Example 108, the subject matter of Examples 106-107 includes, wherein the infrared spectroscopy includes infrared transmission spectroscopy or infrared reflection spectroscopy.

In Example 109, the subject matter of Examples 106-108 includes, wherein a wavelength of the infrared spectroscopy is within a near infrared spectrum.

In Example 110, the subject matter of Examples 106-109 includes, wherein a wavelength of the infrared spectroscopy is within a range of frequencies between 400 nanometers and 2500 nanometers.

In Example 111, the subject matter of Examples 106-110 includes, wherein the inedible tallow sample is prepared directly from a mobile tanker or a bulk tanker and wherein the method is performed on-site where the inedible tallow sample is extracted.

In Example 112, the subject matter of Examples 106-111 includes, wherein the spectrometer is a portable spectrometer.

In Example 113, the subject matter of Examples 106-112 includes, wherein the spectrometer includes a display, and wherein to output the percent of free fatty acid in the inedible tallow sample, the processor circuit is configured to cause the display to present the percent of free fatty acid in the inedible tallow sample.

In Example 114, the subject matter of Examples 106-113 includes, wherein the prepared sample is prepared by agitating the inedible tallow sample while melting the inedible tallow sample.

Example 115 is a method for near infrared evaluation of a characteristic of an inedible tallow sample, the method comprising: receiving a prepared sample of the inedible tallow sample at a spectrometer; scanning, using the spectrometer, the prepared sample with infrared spectroscopy; determining, using a processor, a percent of insoluble impurities in the inedible tallow sample based on a result of the scan; and outputting the percent of insoluble impurities in the inedible tallow sample.

In Example 116, the subject matter of Example 115 includes, wherein the prepared sample is prepared by covering the inedible tallow sample in a petri dish or a slurry cup.

In Example 117, the subject matter of Examples 115-116 includes, wherein the infrared spectroscopy includes infrared transmission spectroscopy or infrared reflection spectroscopy.

In Example 118, the subject matter of Examples 115-117 includes, wherein a wavelength of the infrared spectroscopy is within a near infrared spectrum.

In Example 119, the subject matter of Examples 115-118 includes, wherein a wavelength of the infrared spectroscopy is within a range of frequencies between 400 nanometers and 2500 nanometers.

In Example 120, the subject matter of Examples 115-119 includes, wherein the inedible tallow sample is prepared directly from a mobile tanker or a bulk tanker and wherein the method is performed on-site where the inedible tallow sample is extracted.

In Example 121, the subject matter of Examples 115-120 includes, wherein the spectrometer is a portable spectrometer.

In Example 122, the subject matter of Examples 115-121 includes, wherein outputting the percent of insoluble impurities in the inedible tallow sample includes displaying the percent of insoluble impurities in the inedible tallow sample on a display of the spectrometer or sending the percent of insoluble impurities in the inedible tallow sample to a mobile device for display.

In Example 123, the subject matter of Examples 115-122 includes, wherein the prepared sample is prepared by agitating the inedible tallow sample while melting the inedible tallow sample.

Example 124 is a system for near infrared evaluation of a characteristic of an inedible tallow sample, the system comprising: a spectrometer configured to: emit light comprising a specified range of infrared wavelengths; receive a reflection from a prepared sample of the inedible tallow sample; and establish reflectance data corresponding to the received reflection; and a processor circuit coupled to a memory circuit and communicatively coupled to the spectrometer, the processor circuit configured to: determine a percent of insoluble impurities in the inedible tallow sample corresponding to the characteristic for the inedible tallow sample based on a result of the scan; and output the percent of insoluble impurities in the inedible tallow sample.

In Example 125, the subject matter of Example 124 includes, wherein the prepared sample is prepared by covering the inedible tallow sample in a petri dish or a slurry cup.

In Example 126, the subject matter of Examples 124-125 includes, wherein the infrared spectroscopy includes infrared transmission spectroscopy or infrared reflection spectroscopy.

In Example 127, the subject matter of Examples 124-126 includes, wherein a wavelength of the infrared spectroscopy is within a near infrared spectrum.

In Example 128, the subject matter of Examples 124-127 includes, wherein a wavelength of the infrared spectroscopy is within a range of frequencies between 400 nanometers and 2500 nanometers.

In Example 129, the subject matter of Examples 124-128 includes, wherein the inedible tallow sample is prepared directly from a mobile tanker or a bulk tanker and wherein the method is performed on-site where the inedible tallow sample is extracted.

In Example 130, the subject matter of Examples 124-129 includes, wherein the spectrometer is a portable spectrometer.

In Example 131, the subject matter of Examples 124-130 includes, wherein the spectrometer includes a display, and wherein to output the percent of insoluble impurities in the inedible tallow sample, the processor circuit is configured to cause the display to present the percent of insoluble impurities in the inedible tallow sample.

In Example 132, the subject matter of Examples 124-131 includes, wherein the prepared sample is prepared by agitating the inedible tallow sample while melting the inedible tallow sample.

In Example 186, the subject matter of Examples 178-185 includes, wherein outputting the value includes outputting an average or median of two or more iterations of the method.

Example 187 is at least one machine-readable medium including instructions that, when executed by processing circuitry, cause the processing circuitry to perform operations to implement of any of Examples 1-186.

Example 188 is an apparatus comprising means to implement of any of Examples 1-186.

Example 189 is a system to implement of any of Examples 1-186.

Example 190 is a method to implement of any of Examples 1-186.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The invention claimed is:

1. A method for near infrared evaluation of insoluble impurities of an edible tallow sample, the method comprising:
   receiving a prepared sample of the edible tallow sample at a spectrometer;
   scanning, using the spectrometer, the prepared sample with infrared spectroscopy;
   determining, using a processor, a percent of insoluble impurities in the edible tallow sample based on a result of the scan; and
   outputting the percent of insoluble impurities in the edible tallow sample.

2. The method of claim 1, wherein outputting the percent of insoluble impurities in the edible tallow sample includes displaying the percent of insoluble impurities in the edible tallow sample on a display of the spectrometer or sending the percent of insoluble impurities in the edible tallow sample to a mobile device for display.

3. The method of claim 1, wherein the prepared sample is prepared by covering the edible tallow sample in a petri dish or a slurry cup.

4. The method of claim 1, wherein the infrared spectroscopy includes infrared transmission spectroscopy or infrared reflection spectroscopy.

5. The method of claim 1, wherein a wavelength of the infrared spectroscopy is within a near infrared spectrum.

6. The method of claim 1, wherein a wavelength of the infrared spectroscopy is within a range of frequencies between 400 nanometers and 2500 nanometers.

7. The method of claim 1, wherein the edible tallow sample is prepared directly from a mobile tanker or a bulk tanker and wherein the method is performed on-site where the edible tallow sample is extracted.

8. The method of claim 1, wherein the spectrometer is a portable spectrometer.

9. The method of claim 1, wherein the prepared sample is prepared by agitating the edible tallow sample while melting the edible tallow sample.

10. The method of claim 1, further comprising determining, using the processor, a percent of moisture in the edible tallow sample based on a result of the scan.

11. The method of claim 1, further comprising determining, using the processor, a percent of free fatty acid in the edible tallow sample based on a result of the scan.

12. A system for near infrared evaluation of insoluble impurities of an edible or inedible tallow sample, the system comprising:
   a spectrometer configured to:
      emit light comprising a specified range of infrared wavelengths;
      receive a reflection from a prepared sample of the edible or inedible tallow sample; and
      establish reflectance data corresponding to the received reflection; and
   a processor circuit coupled to a memory circuit and communicatively coupled to the spectrometer, the processor circuit configured to:
      determine a percent of insoluble impurities in the edible or inedible tallow sample based on the reflectance data; and
   output the percent of insoluble impurities in the edible or inedible tallow sample.

13. The system of claim 12, further comprising determining, using the processor circuit, a percent of moisture in the edible or inedible tallow sample; or a percent of free fatty acid in the edible or inedible tallow sample.

14. A method for near infrared evaluation of insoluble impurities ic of an inedible tallow sample, the method comprising:
   receiving a prepared sample of the inedible tallow sample at a spectrometer;
   scanning, using the spectrometer, the prepared sample with infrared spectroscopy;
   determining, using a processor, a percent of insoluble impurities in the inedible tallow sample based on a result of the scan; and
   outputting the percent of insoluble impurities in the inedible tallow sample.

15. The method of claim 14, wherein outputting the percent of insoluble impurities in the inedible tallow sample includes displaying the percent of insoluble impurities in the inedible tallow sample on a display of the spectrometer or sending the percent of insoluble impurities in the inedible tallow sample to a mobile device for display.

16. The method of claim 14, wherein a wavelength of the infrared spectroscopy is within a near infrared spectrum.

17. The method of claim 14, wherein a wavelength of the infrared spectroscopy is within a range of frequencies between 400 nanometers and 2500 nanometers.

18. The method of claim 14, wherein the prepared sample is prepared by agitating the inedible tallow sample while melting the inedible tallow sample.

* * * * *